April 29, 1941.  J. P. McHUGH  2,239,684
METHOD AND APPARATUS FOR PRODUCING THROWN YARN
Filed Nov. 21, 1936   16 Sheets-Sheet 4
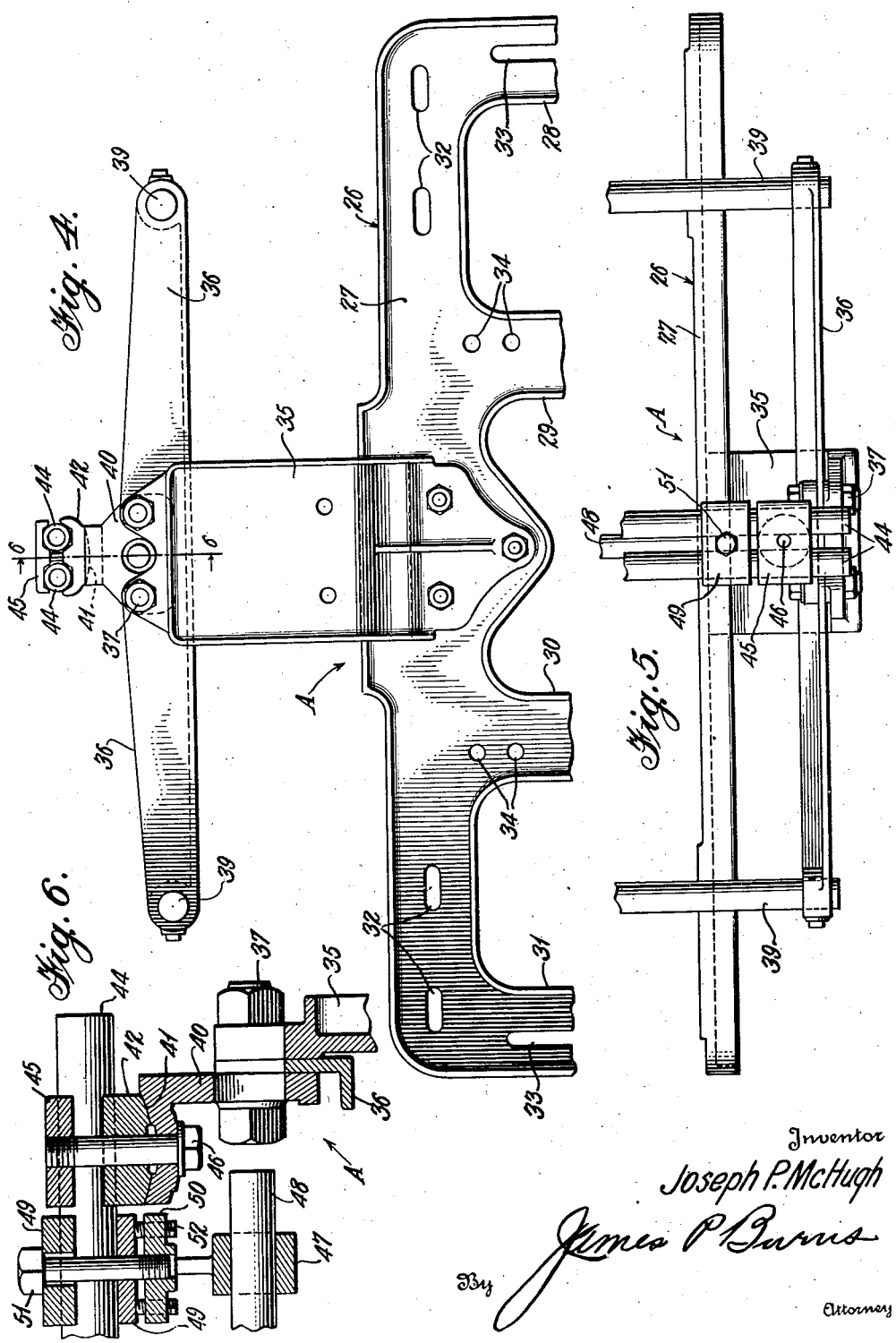

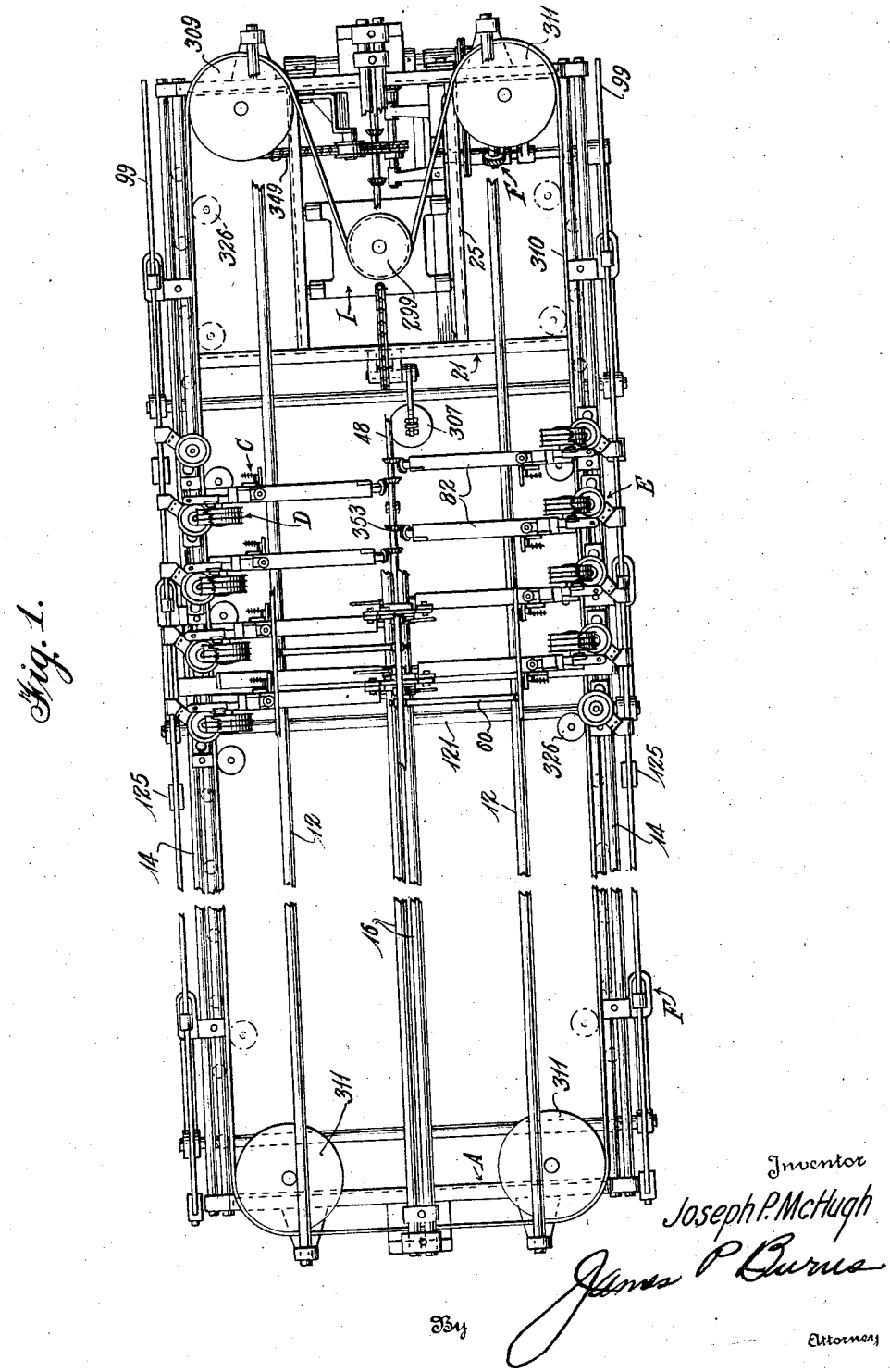

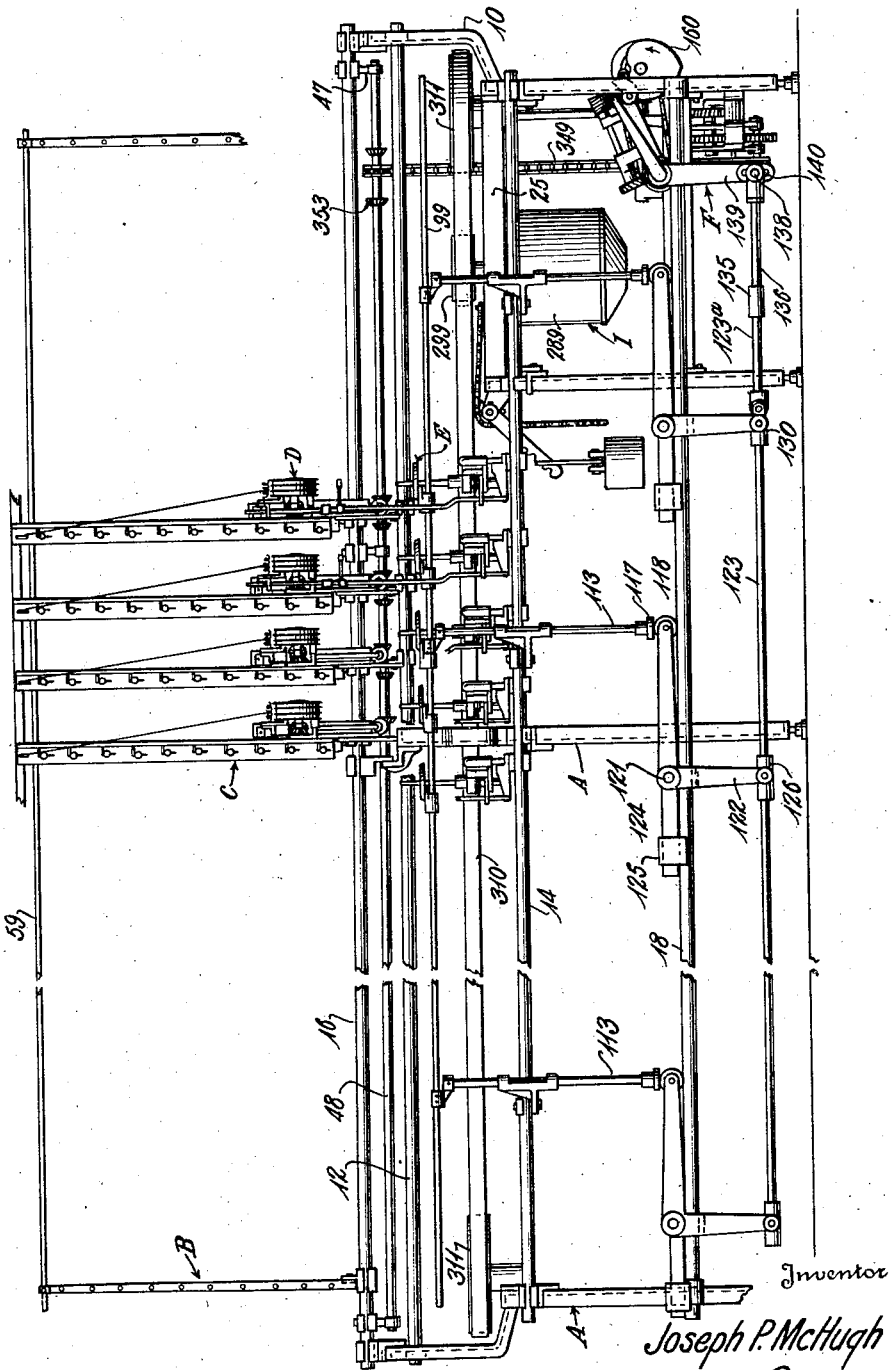

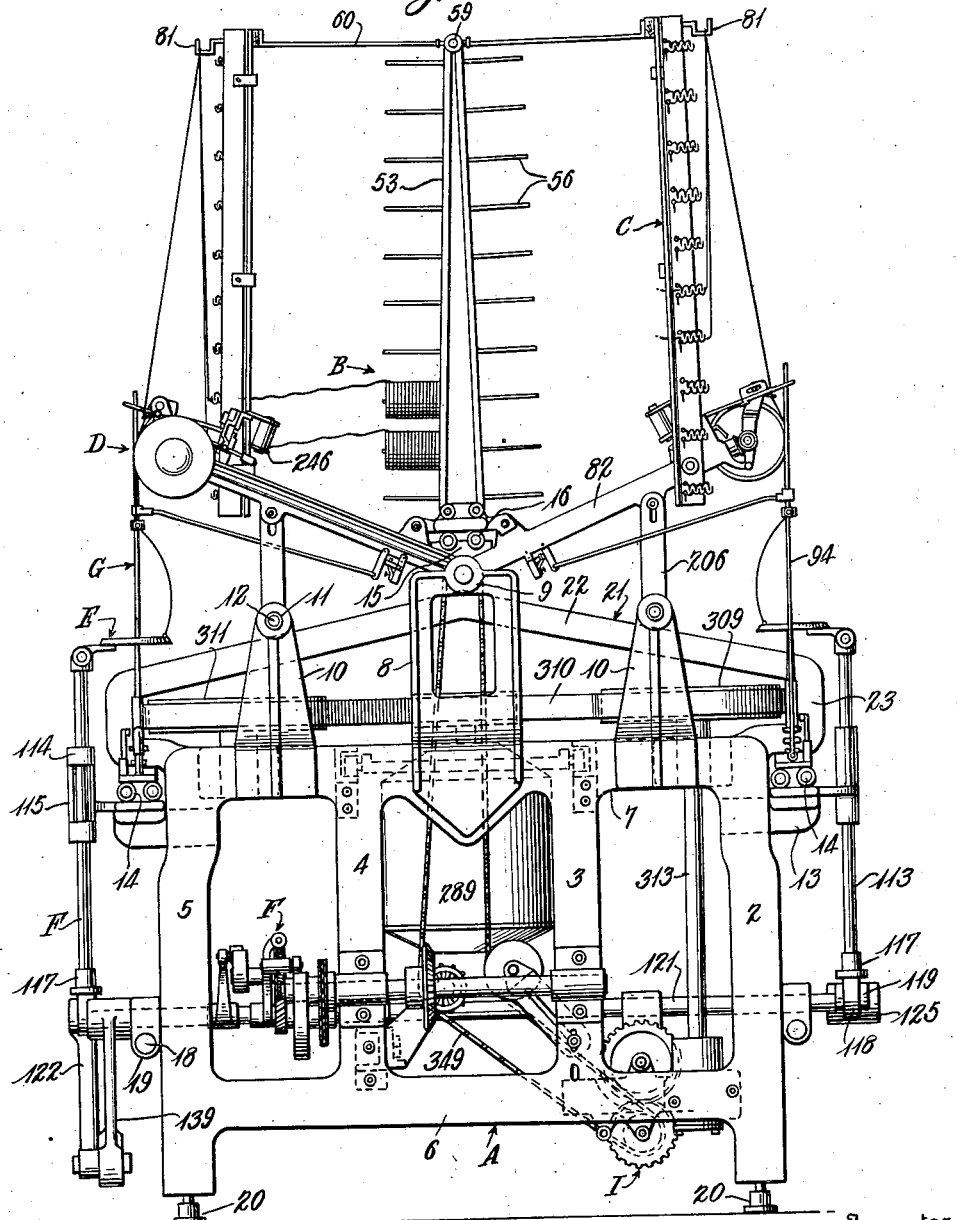

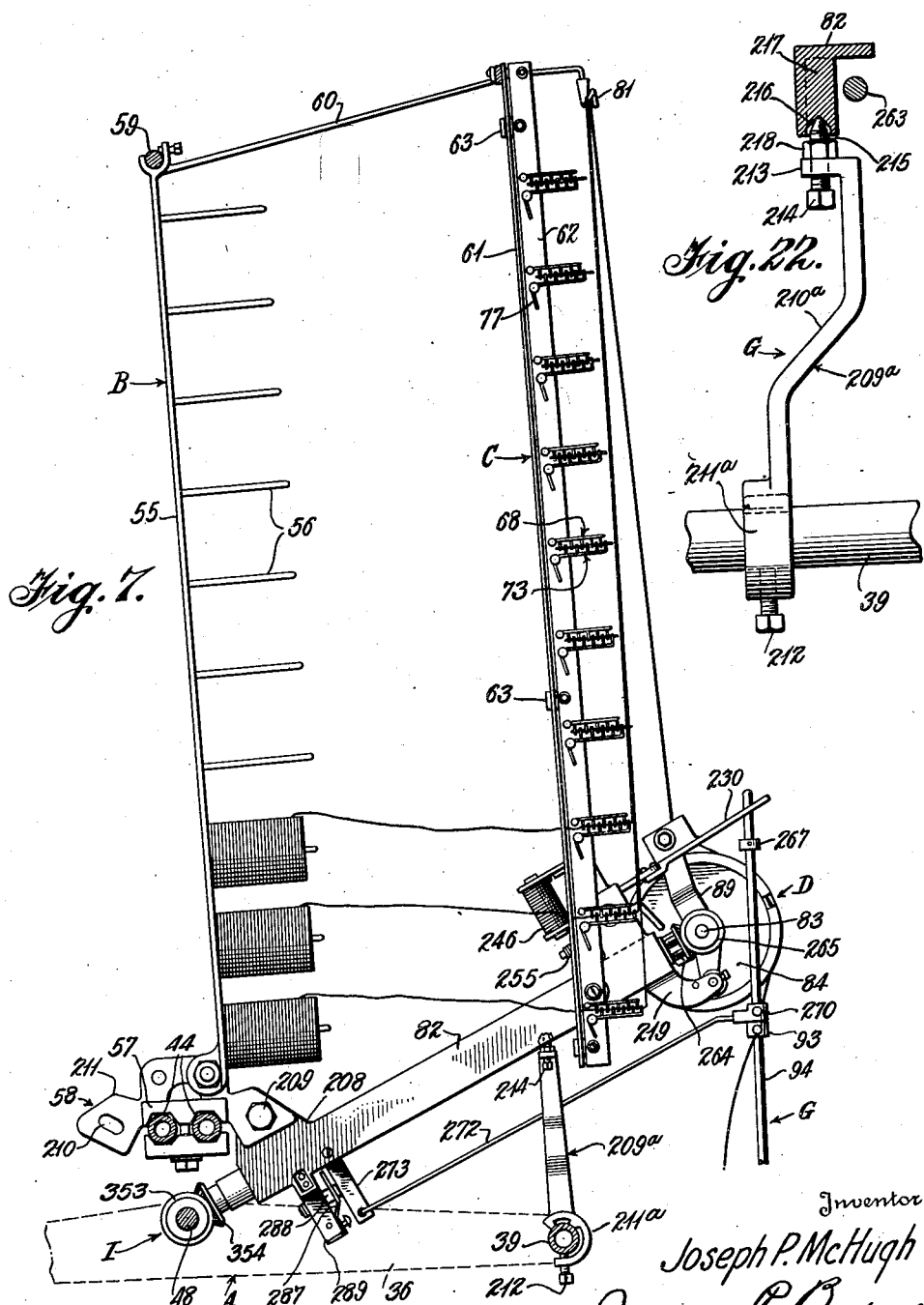

April 29, 1941.   J. P. McHUGH   2,239,684
METHOD AND APPARATUS FOR PRODUCING THROWN YARN
Filed Nov. 21, 1936   16 Sheets-Sheet 6
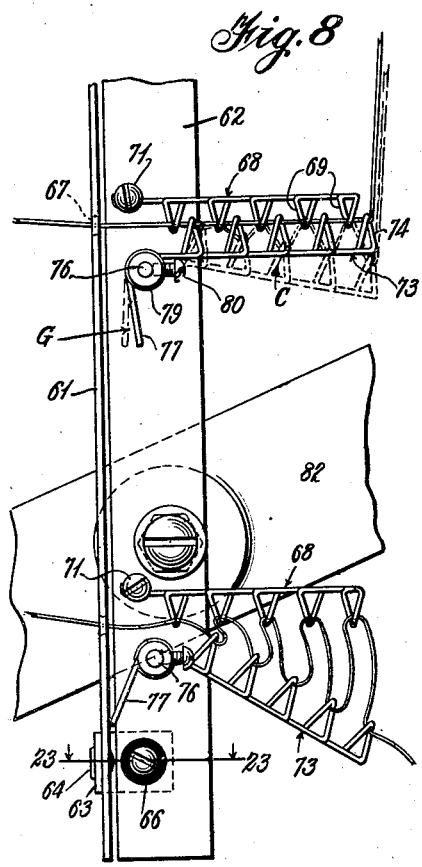
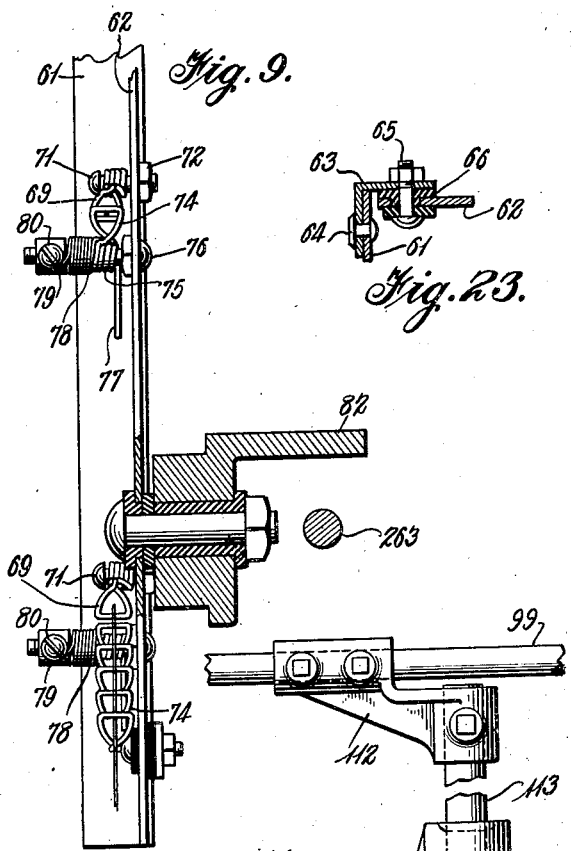
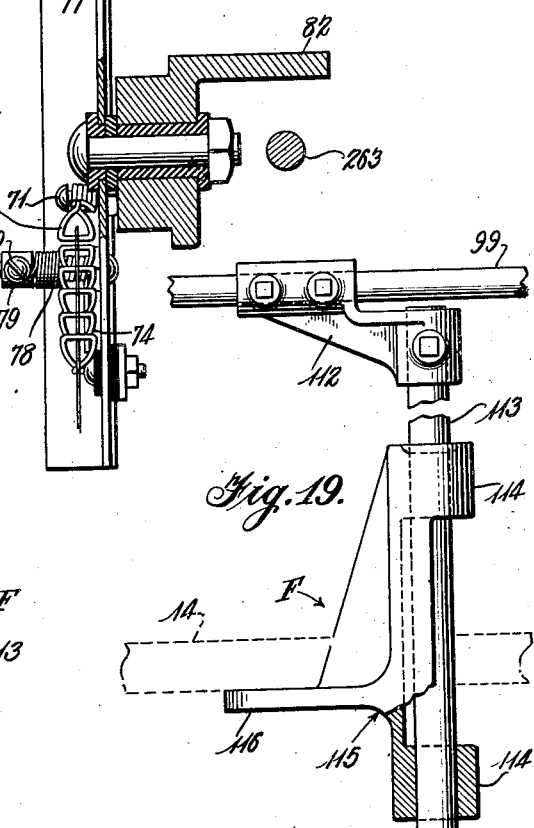
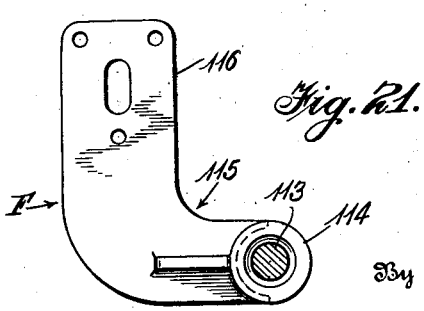
Inventor
Joseph P. McHugh
By James P. Burns
Attorney April 29, 1941.   J. P. McHUGH   2,239,684
METHOD AND APPARATUS FOR PRODUCING THROWN YARN
Filed Nov. 21, 1936   16 Sheets-Sheet 7
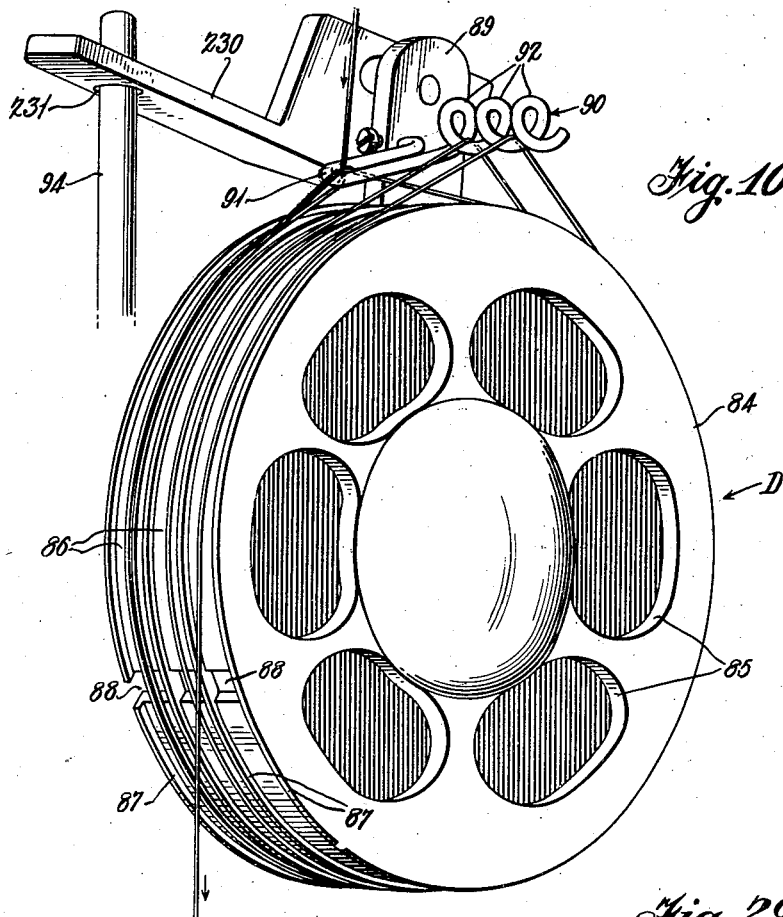
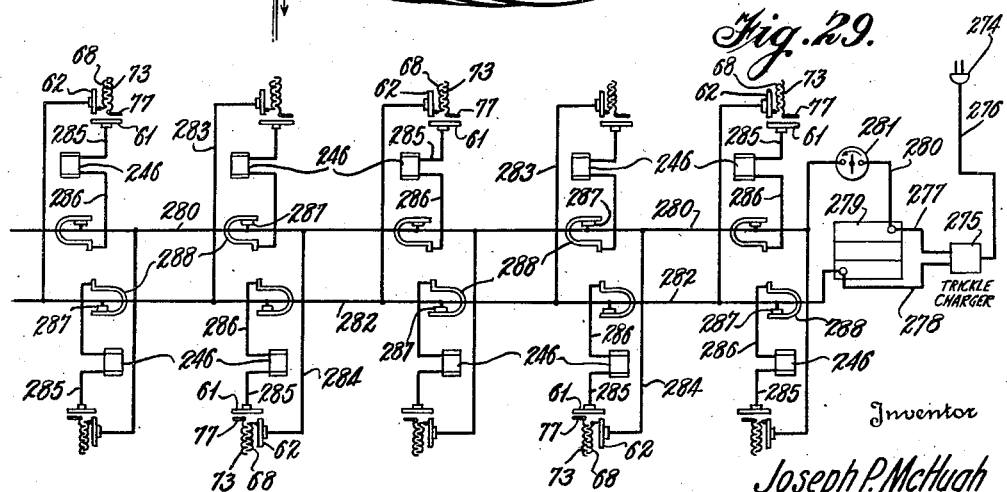
Inventor
Joseph P. McHugh
By James P. Burns
Attorney

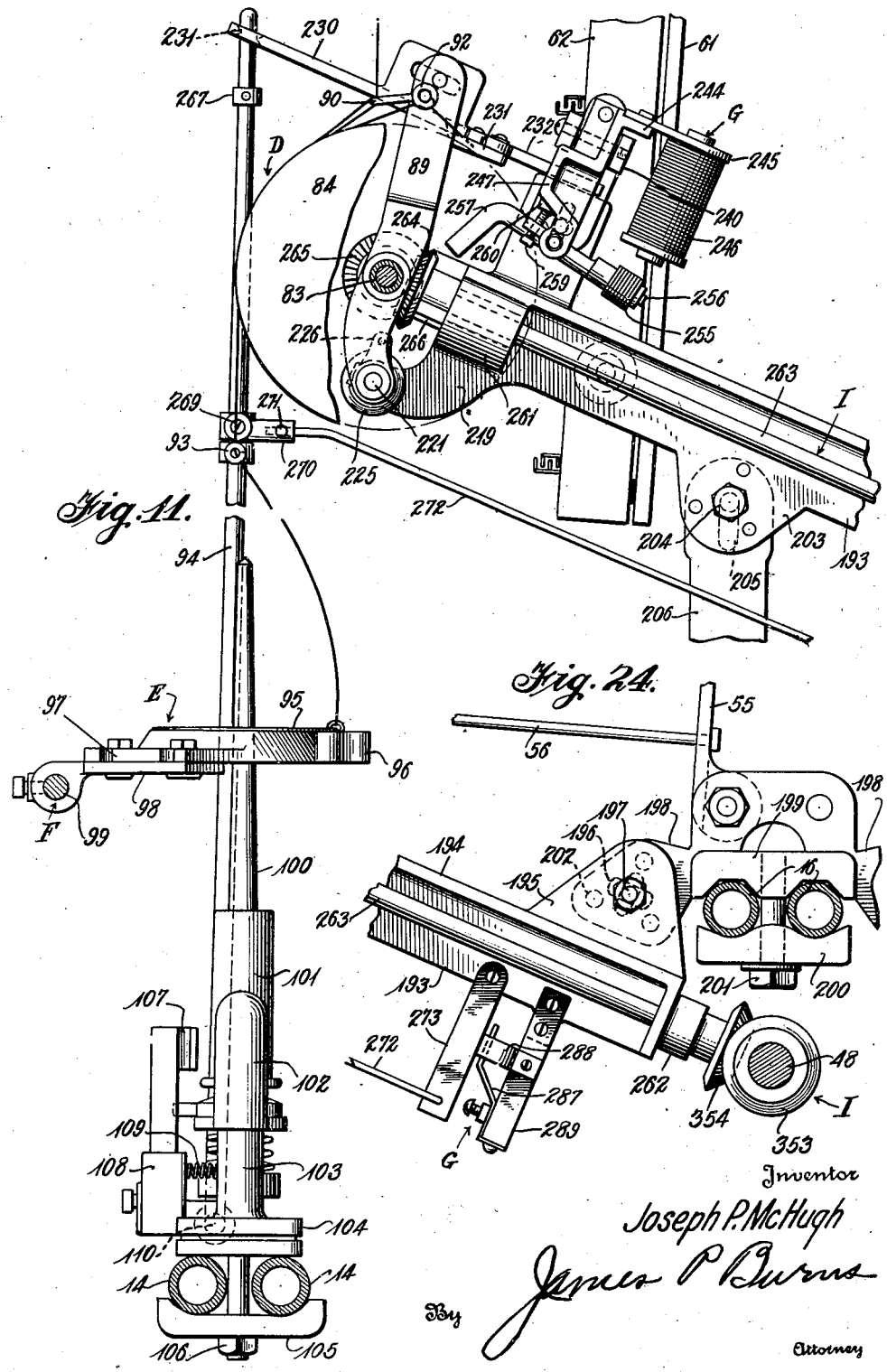

April 29, 1941. J. P. McHUGH 2,239,684
METHOD AND APPARATUS FOR PRODUCING THROWN YARN
Filed Nov. 21, 1936 16 Sheets-Sheet 9
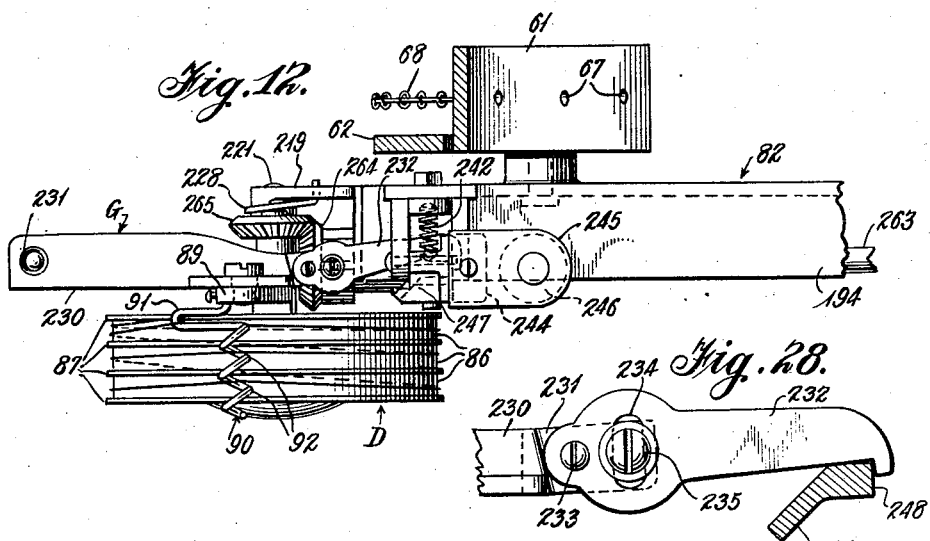
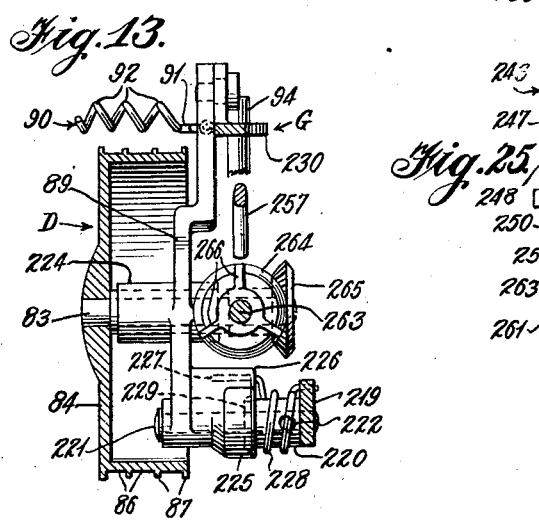
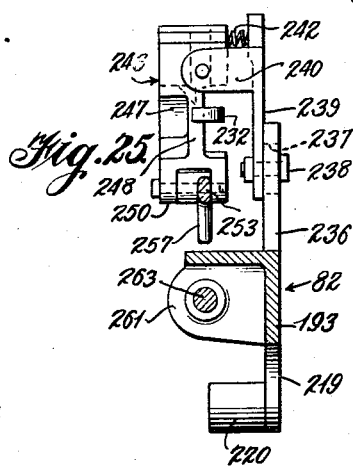
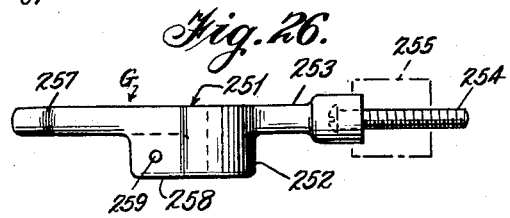
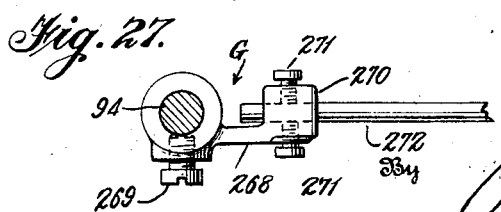
Inventor
Joseph P. McHugh
James P. Burns
By
Attorney April 29, 1941.  J. P. McHUGH  2,239,684
METHOD AND APPARATUS FOR PRODUCING THROWN YARN
Filed Nov. 21, 1936  16 Sheets-Sheet 10
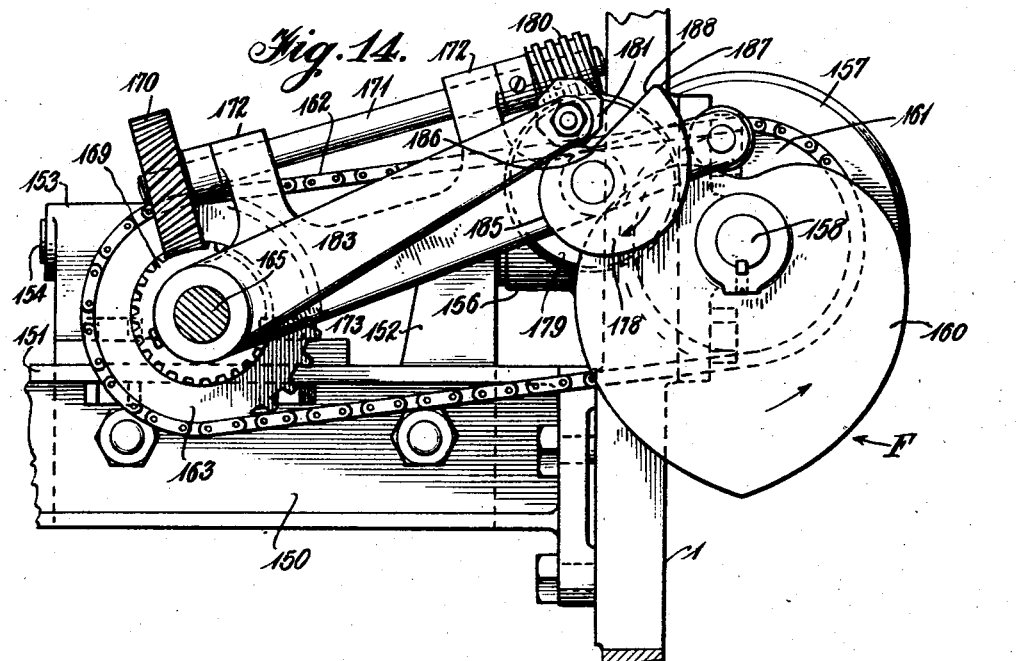
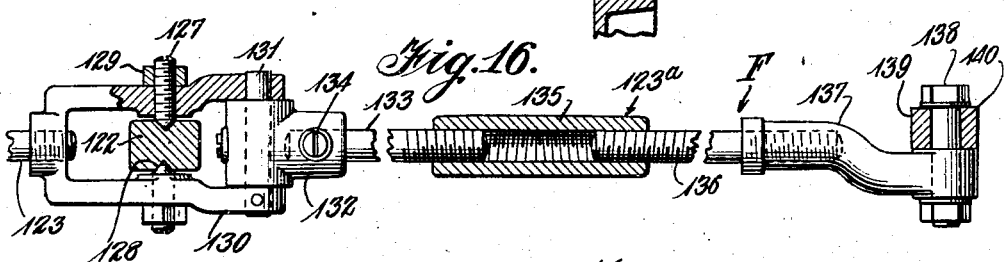
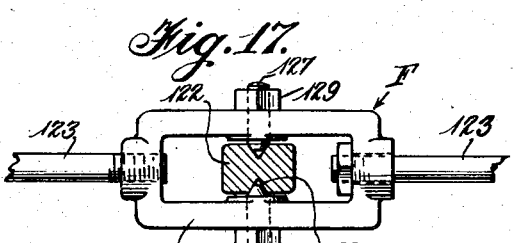
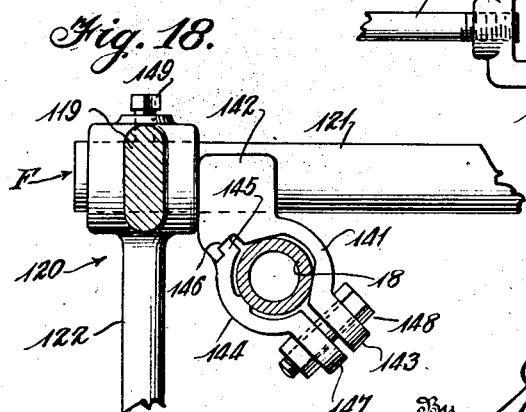
Inventor
Joseph P. McHugh
By James P. Burns
Attorney April 29, 1941. J. P. McHUGH 2,239,684
METHOD AND APPARATUS FOR PRODUCING THROWN YARN
Filed Nov. 21, 1936 16 Sheets-Sheet 11
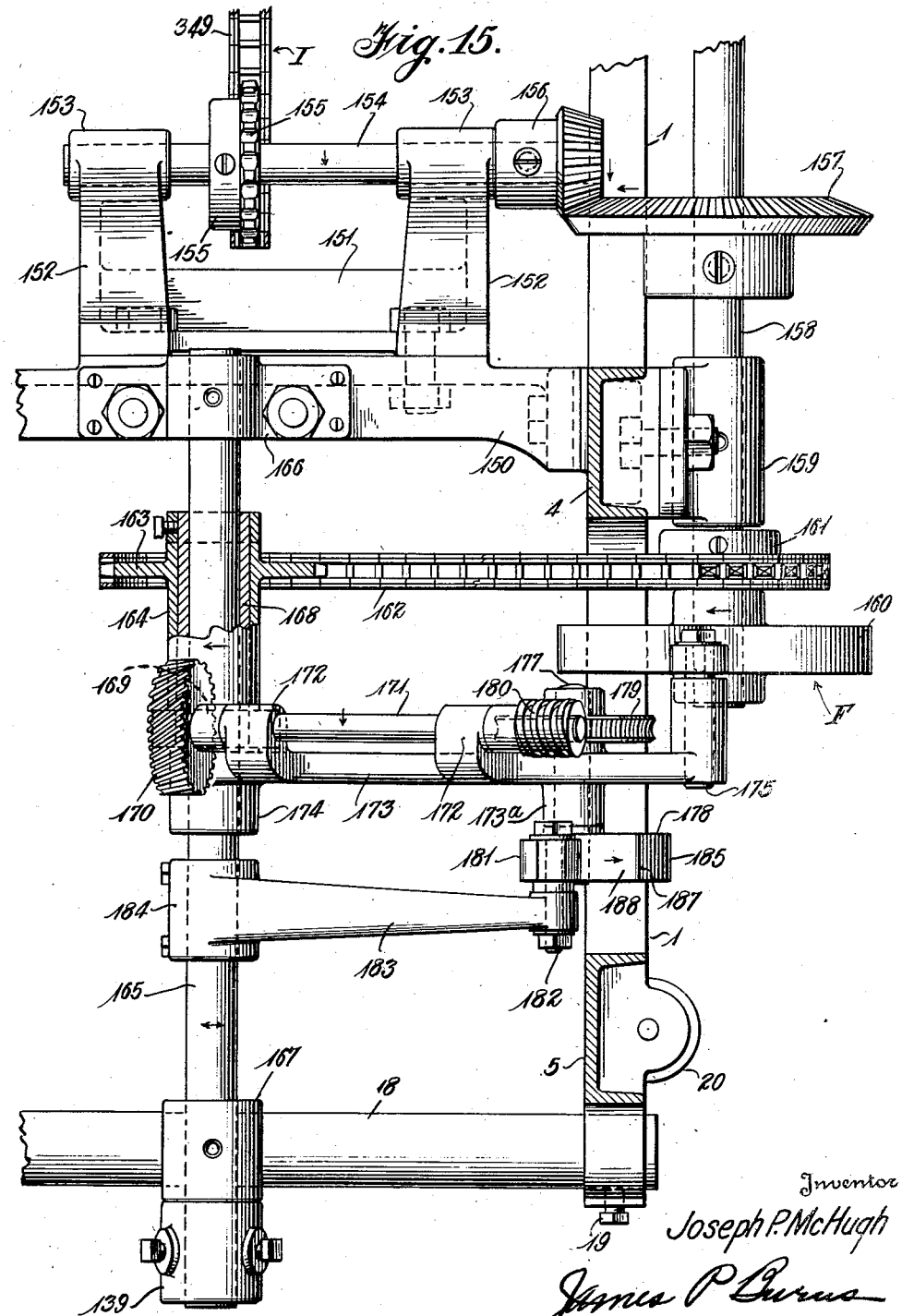
Inventor
Joseph P. McHugh
By James P. Burns
Attorney April 29, 1941.  J. P. McHUGH  2,239,684
METHOD AND APPARATUS FOR PRODUCING THROWN YARN
Filed Nov. 21, 1936  16 Sheets-Sheet 12
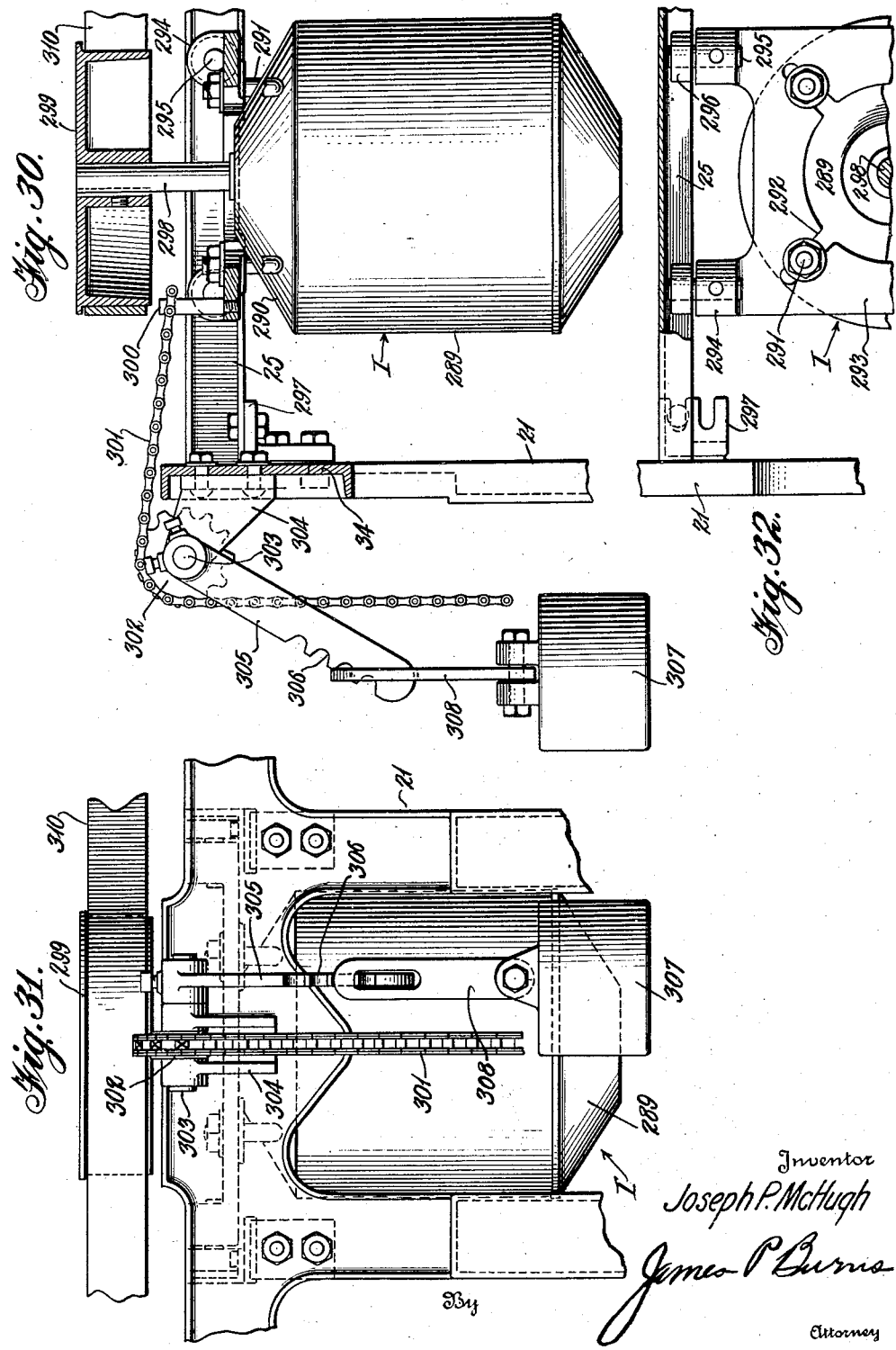
Inventor
Joseph P. McHugh
By James P. Burns
Attorney April 29, 1941.　　　　J. P. McHUGH　　　　2,239,684
METHOD AND APPARATUS FOR PRODUCING THROWN YARN
Filed Nov. 21, 1936　　　16 Sheets-Sheet 13

Inventor
Joseph P. McHugh
By James P. Burns
Attorney

April 29, 1941. J. P. McHUGH 2,239,684
METHOD AND APPARATUS FOR PRODUCING THROWN YARN
Filed Nov. 21, 1936 16 Sheets-Sheet 14
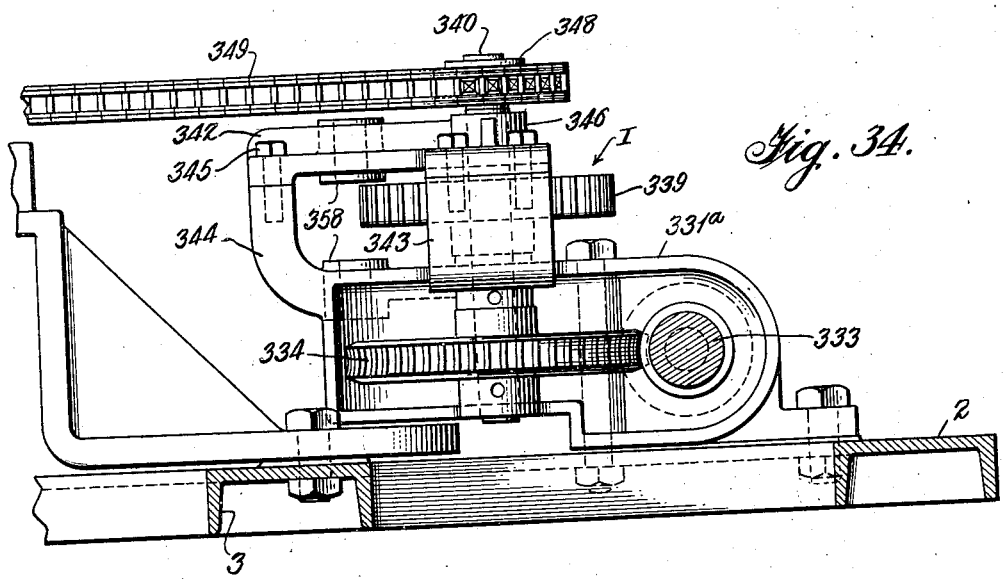
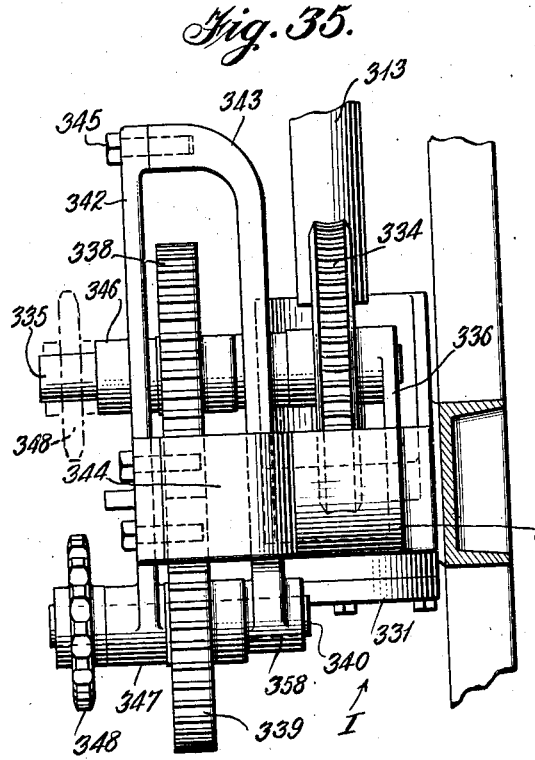
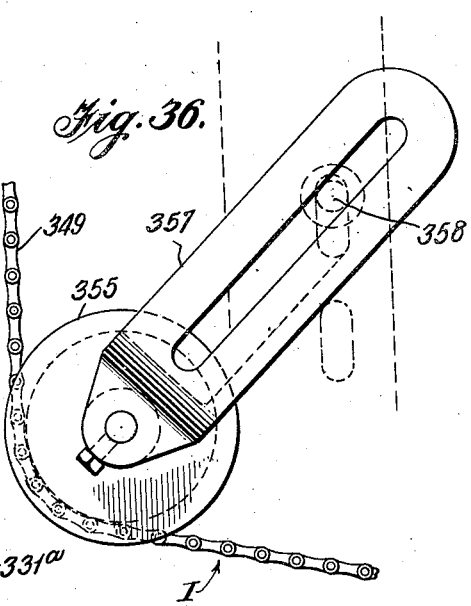
Inventor
Joseph P. McHugh
James P. Burns
By
Attorney

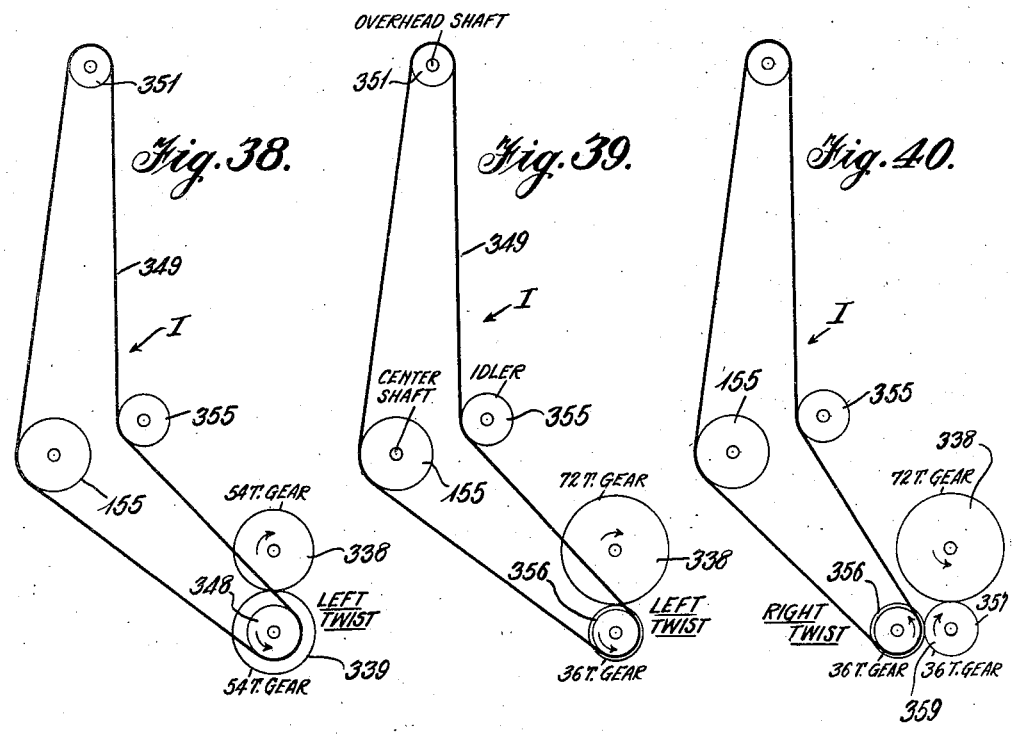
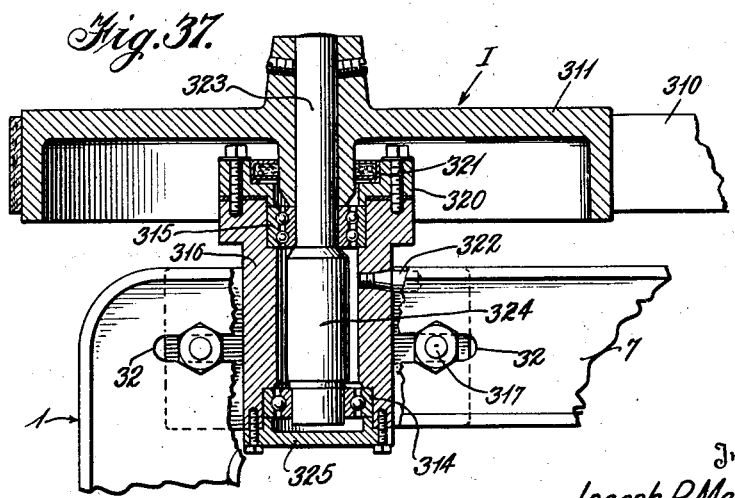

April 29, 1941.    J. P. McHUGH    2,239,684
METHOD AND APPARATUS FOR PRODUCING THROWN YARN
Filed Nov. 21, 1936    16 Sheets-Sheet 16
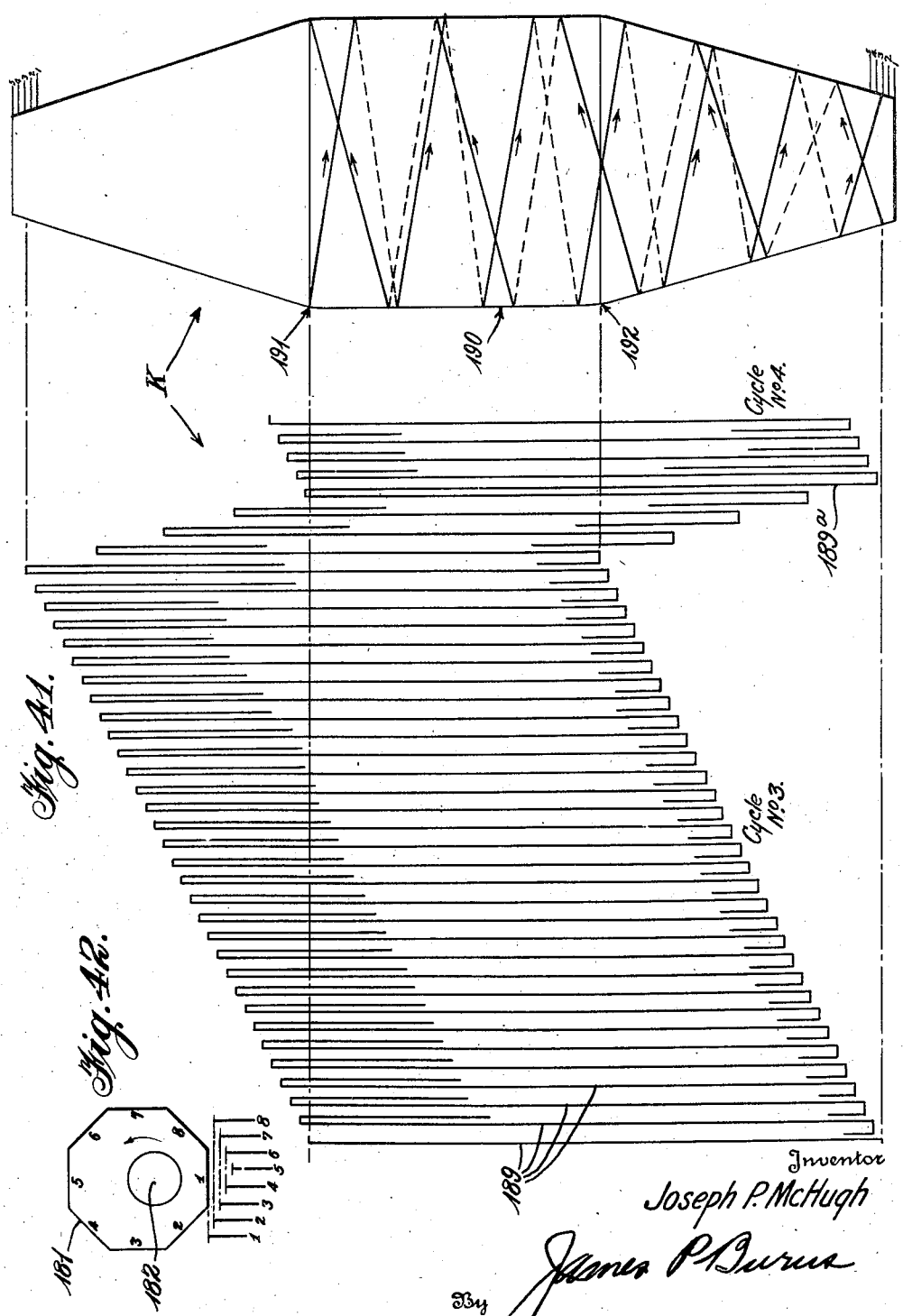
Inventor
Joseph P. McHugh
By James P. Burns
Attorney Patented Apr. 29, 1941

2,239,684

UNITED STATES PATENT OFFICE 2,239,684

METHOD AND APPARATUS FOR PRODUCING THROWN YARN

Joseph P. McHugh, Scranton, Pa., assignor, by mesne assignments, to Industrial Machine Corporation, a corporation of Delaware Application November 21, 1936, Serial No. 112,150

18 Claims. (Cl. 57—75)

This invention relates to a method and apparatus for producing improved fully thrown lustrous yarn.

The term "lustrous yarn" as employed herein is intended to embrace such yarns as raw silk, rayon or artificial silk, spun silk, spun rayon, or yarn made from any of the above fibers as well as so-called synthetic pigment yarns.

It is the desideratum of the throwster to produce fully thrown yarn that will have high elasticity and be of substantially uniform cross-sectional area throughout its length. Such a yarn is free from unevenness and produces a fabric of uniform texture.

The lack of evenness in hosiery tram has given rise to serious problems in the hosiery industry, more particularly in the production of so-called sheer fabric. Uneven yarn results in the formation of what are known to the trade as "rings," "shadows," and "washboard effects" in the finished hose. These are largely the result of unevenness in the cross-sectional area and configuration of the yarn used in knitting the hose. Various remedial schemes have been evolved to overcome this recognized defect in the yarn.

The present invention contemplates the provision of a method and apparatus through the medium of which thrown yarn possessing a high degree of elasticity, i. e., per cent elongation, and substantially uniform cross-sectional area and configuration may be produced.

The twisting of yarn effects what is known as a "take-up" in the yarn. This "take-up" is represented by the shortening of the yarn when twisted. The more turns per inch inserted during the twisting of the yarn, the shorter the same becomes. Naturally the heavier the yarn, the greater the degree of "take-up."

The extent of the "take-up" is due to three primary factors: first, the tension imposed on the yarn; second, the number of turns per inch imparted in the twisting operation; and, third, the thickness of the yarn. This "take-up" feature is valuable to the yarn for the reason that it makes up somewhat for the unavoidable and natural inconsistencies in the starting material. These inconsistencies are due to what are termed in the art "fine and heavy ends." The compensation for the fine and heavy portions of the yarn is particularly effected in my improved method of ring or cap spinning wherein the twist rolls into the yarn before it is exposed to the high centrifugal force of the balloon caused by the spinning element.

The compensation for yarn variations effected through the medium of the twist is, of course, greater for higher twists than for lower twists since the more turns given the yarn, the more it takes up, which in turn makes the yarn heavier than prior to twisting thereof. In other words, a part of the length of the yarn is absorbed in the diameter of the same. This increase in diameter for a fine end portion causes the same to be increased in diameter to a degree sufficient to compare somewhat favorably with the normal diameter of the yarn. In doubling a plurality of single ends, the "take-up" is further augmented by the compensating effect of the several single ends that are being doubled.

It can be seen from the foregoing that if the yarn can be kept in the condition that it assumes when spun and directly placed, while in this condition, into fabric forming machinery without redrawing, coning, or quilling and without exposing the yarn to a plurality of subsequent treatments involving various tension conditions, the yarn will possess the elongation given to it in the single spinning operation. Such a yarn is far superior to yarns conventionally produced since proper elongation is very valuable in the knitting of silk hosiery as well as in the use of synthetic yarns for any purpose.

It has been ascertained that one of the contributing factors heretofore responsible for variations in cross-sectional area of thrown yarn produced in accordance with conventional practice has been the repeated and variable tension imposed on the yarn in the throwing process. For example, in throwing raw silk in accordance with conventional practice, a plurality of single ends are drawn from individual bobbins rotated by the draft imposed on the single ends. Some of the bobbins may be full and others substantially empty, causing a different tension to be imposed on each single end entering the composite doubled yarn.

Additionally, the drawing of the silk on rotating bobbins, resulting in the placing of uneven tension on the respective single ends, often results in the formation of loops in the yarn due to the tendency of one bobbin to run ahead of its companions and cause a slackening of that single end and a resultant loop which is highly objectionable in the finished yarn.

After the yarn is doubled and receives its preliminary twist, it next has imparted thereto a high twist on a so-called up-twister. In this operation the yarn is again subjected to tension and unevenly attenuated. This tensioning of the doubled yarn destroys, to a considerable extent, the compensating effect obtained by the doubling step. On redrawing the yarn, it is further tensioned and attenuated, thus decreasing its elasticity and increasing its unevenness.

In accordance with the present invention, the yarn is subjected to no attenuation whatever. The single ends are each taken off from supplies with just sufficient pull to lift the thread from the supply. An absolute uniform minimum tension is imposed on each single end entering the composite yarn, and the doubling and spinning are completed in a single step without subjecting the thrown yarn to any tension or drafting action whatever. In this way the natural elasticity is fully preserved and acts to compensate for incidental unevenness in the yarn. Additionally I have observed that yarn produced in accordance with the present invention is of substantially uniform configuration and is virtually round, whereas yarns produced in accordance with current practice are, because of the repeated and uneven tensioning thereof, distorted and irregular in configuration, producing shadows in the fabric formed therefrom.

In accordance with the present invention, therefore, the yarn is caused to have imparted thereto a very considerable twist before being subjected to the high centrifugal force of the balloon caused by the spinning element.

Additionally in accordance with the present invention, the yarn is directly packaged from the spinning step in its then attained condition without having any stretch applied to it through other process steps, such as final twisting, coning, quilling, and redrawing.

Furthermore, yarn produced in accordance with the present invention contains more natural gum than when produced by current methods since in the present process the twist imparted to the yarn prior to subjection to the centrifugal force of the single spinning step tends to preclude the so-called shedding of the gum content as well as the shedding of the lubricant added in the bath or soaking step preliminary to the spinning operation. The imparting of substantial twist to the yarn prior to subjection to the centrifugal force of the spinning step likewise tends to avoid the shedding of fibers that would otherwise be thrown out because of the splitting of the filaments under the action of centrifugal force.

The method and apparatus of the present invention additionally enable the production of fully thrown lustrous yarn free from ruptured filaments occasioned in conventional practice due to the abuse of the yarn in repeated mechanical cleaning steps and because of the repetitions of subjection to high centrifugal force.

It is a further purpose and object of the invention to produce a finished package of fully thrown lustrous yarn that permits of taking the yarn from the package of a knitting machine without snarling or breaking. It is likewise the purpose of the invention to permit the direct building of cops or quills ready for direct use in the shuttle of a weaving machine.

The invention further contemplates the provision of a method and apparatus for fully throwing lustrous yarn through the medium of which the yarn is protected against deleterious effects of friction which denude the yarn of lubricant, thus preserving the texture and structure of the yarn.

It is additionally an object of the invention to provide a novel and improved apparatus for effecting the complete throwing of lustrous yarn in a single spinning step while producing a novel package of especial utility in fabric forming machinery.

There are many detailed objects and advantages that flow from the invention and various of its elements that will become apparent as the description proceeds.

The invention will now be described in detail with reference to the accompanying drawings.

In the accompanying drawings forming a part of this specification and in which like numerals are employed to designate like parts throughout the same:

Figure 1 is a top plan view of the entire machine embodying this invention;

Figure 2 is a side elevational view of the machine shown in Figure 1;

Figure 3 is an end elevational view of the said machine;

Figure 4 is a fragmentary end elevational view of one end member of a modified form of main frame unit;

Figure 5 is a top plan view of the frame modification shown in Figure 4;

Figure 6 is a detail vertical sectional view taken on line 6—6 of Figure 4;

Figure 7 is a detail elevational view of a portion of the machine and illustrates the thread or yarn supply with tensioning mechanism for the single end taken from the supply bobbin or spool and with feed mechanism and stop motion mechanism also illustrated;

Figure 8 is a detail elevational view of the thread or yarn tensioning mechanism;

Figure 9 is a view taken at right angles to Figure 8;

Figure 10 is a detail perspective view illustrating the form of feed roll and an associated thread or yarn guide;

Figure 11 is a detail elevational view disclosing a portion of the stop motion mechanism, a ring spinner, and a spindle with its associated brake;

Figure 12 is a detail top plan view illustrating a portion of the stop motion mechanism and the feed roll;

Figure 13 is a vertical sectional view of the mechanism shown in Figure 12;

Figure 14 is a detail end elevational view of the traverse or builder mechanism employed for effecting proper traverse movement of the various ring spinners;

Figure 15 is a top plan view of the traverse or builder mechanism disclosed in Figure 14;

Figure 33:
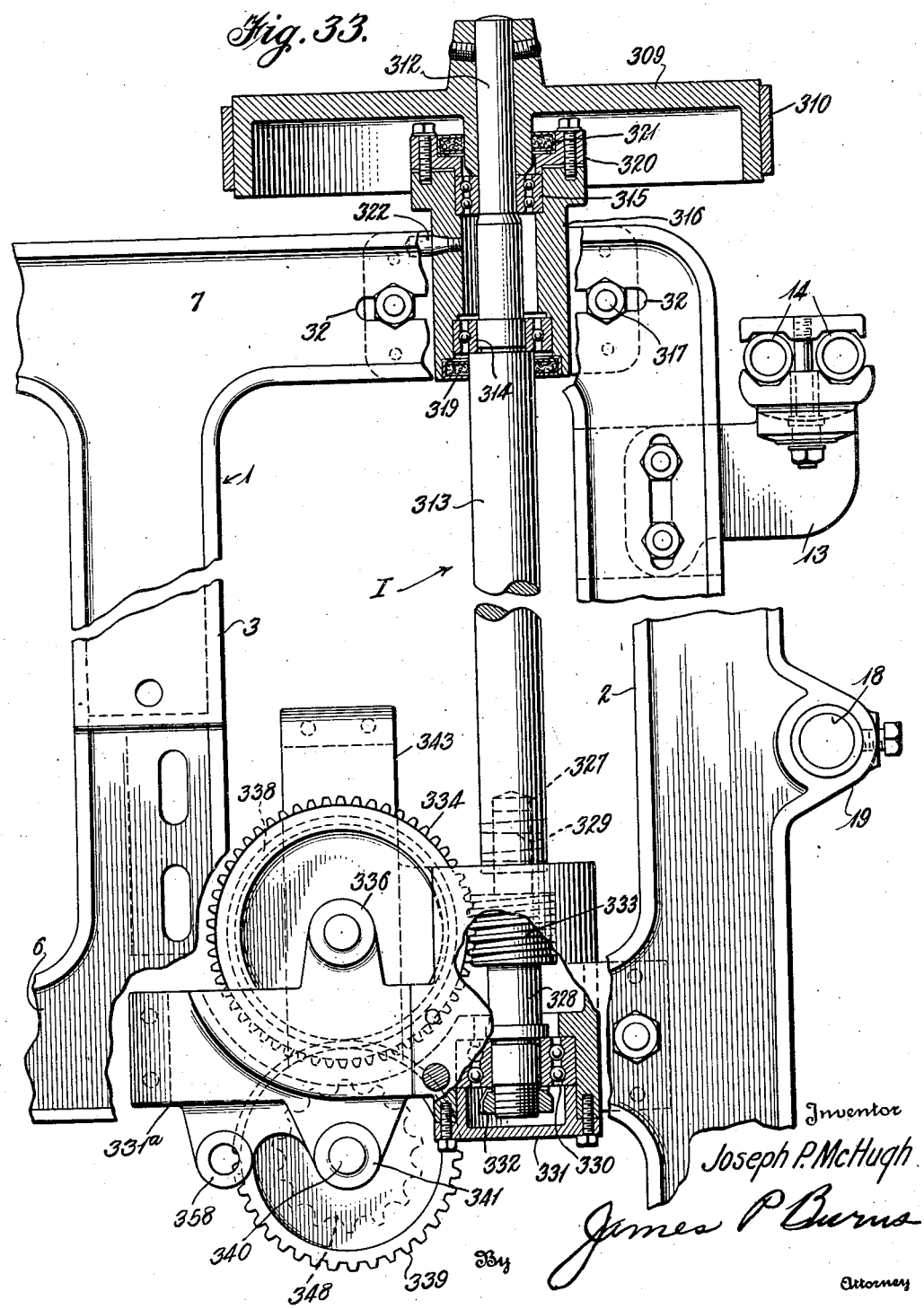

Figures 16 to 21, inclusive, are detail views of different portions of the traverse or builder motion mechanism;

Figure 22 is a detail elevational view of a supporting or mounting arm employed in connection with the drive mechanism for the feed roll;

Figure 23 is a detail transverse sectional view of a portion of the tension mechanism supporting bar;

Figure 24 is a detail elevational view of a portion of the mounting and drive mechanism for the feed roll illustrated in Figure 11;

Figures 25 to 27, inclusive, are detail views of different portions of the stop motion mechanism illustrated more completely in Figures 11 and 12;

Figure 28 is a detail plan view of a latch member employed in the stop motion mechanism;

Figure 29 is a diagrammatic view of the wiring system employed as a part of the stop motion mechanism;

Figure 30 is a detail side elevational view of mechanism employed for adjusting the electric motor, or other prime mover, to effect tightening or tensioning of the drive belt for the various spindles;

Figure 31 is a view in elevation taken at right angles to the disclosure of Figure 30;

Figure 32 is a detail top plan view disclosing in part the manner of mounting the electric motor for adjustment longitudinally of the spinner frame;

Figure 33 is a detail elevational view, partly illustrated in section and partly broken away, of the drive mechanism from the spindle driving belt to the drive for the traverse or builder motion mechanism and the feed rolls;

Figure 34 is a detail elevational view of a portion of the drive mechanism illustrated in the lower portion of Figure 33;

Figure 35 is a side elevational view of the drive mechanism illustrated in Figure 34;

Figure 36 is a detail elevational view of a sprocket chain adjusting idler employed to tension the chain;

Figure 37 is a vertical sectional view of an idler pulley employed in connection with the spindle driving belt;

Figures 38 to 40, inclusive, are diagrammatic views of the sprocket and chain mechanism employed for driving the traverse or builder motion mechanism and the feed roll;

Figure 41 illustrates diagrammatically the contour of a finished package of thread or yarn produced by this machine with a chart or graph illustrating the building of the package by a multiple cycle traverse motion of the spinner ring; and Figure 42 is a schematic view illustrating the manner in which an octagon shaped cam, which forms a part of the traverse or builder motion mechanism, functions to progressively adjust the various cycles employed for building a single package.

It is believed that a brief description of the various mechanisms, or units, considered in the order in which the single end strands are dealt with in throwing the same to produce the desired doubled and twisted yarn and the final headless package, will enable one skilled in the art to arrive at a general understanding of the machine and its mode of operation.

A more detailed description will follow for those who are interested in a minute study of the machine.

The main or base frame of the machine, designated in its entirety by the reference character A, is disclosed in one form in Figures 1 to 3, inclusive, and in a modified form in Figures 4 to 7, inclusive. This main or base frame A consists of end frame members or castings and intermediate frame members or castings which are spaced at any desired distances along the length of the entire frame. Preferably, the end frames or casting members are made interchangeable while the intermediate frame members or castings are of identical construction with respect to each other. This fact necessitates the use of only two different types of frame members. The various frame members are interconnected and braced by longitudinally extending rails or bars to which the frame members or castings are suitably connected. By the use of any desired number of intermediate frame members or castings, and interconnecting rails or bars of proper length, spinning frames may be produced of many different lengths and with widely varying numbers of spindles.

The single end strands or composite yarns which are to be completely thrown in this machine for producing the desired final headless package are supplied from the mechanism designated in its entirety by the reference character B clearly illustrated in Figures 1 to 3, inclusive, and 7. The single end strands or preliminary composite yarns to be doubled and twisted to form the final yarn are supplied from bobbins or spools which are carried by creels. The bobbins or spools carrying the supply of single ends, or the like, are supported in a manner to enable the single end strands to be fed axially without an appreciable amount of tension or pull being placed thereon. In the actual operation of the machine, the single end strands have the appearance of floating as they leave the bobbins or spools. They clearly can be seen to flutter and ripple in the space between the supply bobbins and the tensioning mechanism.

The single ends or preliminary composite strands are fed through tensioning mechanism designated in its entirety by the reference character C. This tensioning mechanism is very clearly illustrated in Figures 2, 3, and 7 to 9, inclusive. The various single end or preliminary composite strands are all subjected to light, uniform tension by this mechanism.

The feeding of the yarn from the supply mechanism and through the tensioning mechanism is effected by the feeding devices designated in their entirety by the reference character D. This feeding mechanism is illustrated very completely in Figures 1 to 3, inclusive, 7, and 10 to 13, inclusive. In the feeding of the single end or preliminary composite strands, the same leave their several tensioning devices, constituting the tensioning mechanism C, and are fed upwardly through a suitable porcelain condensing eye and then downwardly to a feed roll of considerable diameter, as compared to feed rolls forming a part of spinning frames now in common use throughout the industry. The doubled strands are given several turns around this large feed roll. This comparatively large amount of strands maintained between the several tensioning devices and the feed roll, coupled with the large supply of doubled strands maintained on the feed roll, plays a very important part in enabling this machine to produce fully thrown yarn which possesses a very high rating for percentage of evenness.

The doubled strands leave the feed roll with a preliminary twist provided therein and then travel to the ring spinner mechanism which is designated in its entirety by the reference character E. This ring spinner mechanism is clearly illustrated in Figures 1 to 3, inclusive, and 11.

The ring spinner mechanism puts the final twist in the doubled strands and builds the desired final headless package on quills, cops, cones, or the like, as a result of the action of the traveler, which forms a part of the ring spinner, the traverse of the ring spinner with reference to the spindle on which the quill, cop, cone, or the like, is mounted, and the speed of rotation of the spindle.

Suitable traverse or builder motion mechanism is provided for properly actuating the ring spinner. This traverse or builder motion mechanism is designated in its entirety by the reference character F and is very completely illustrated in Figures 1, 2, and 14 to 21, inclusive.

Suitable stop motion mechanism is provided for breaking the drive to the feed roll of the feeding mechanism D when any one of the strands breaks at any point between the supply bobbin or spool and the feed roll. This stop motion mechanism is very clearly and completely illustrated in Figures 1 to 3, inclusive, 7 to 13, inclusive, and 22 to 28, inclusive, and is designated in its entirety by the reference character G.

The stop motion mechanism is partly electrical. The wiring diagram for the stop motion mechanism is illustrated diagrammatically in Figure 29 and is referred to in its entirety by the reference character H.

From the above brief description, it will be appreciated that a suitable form of drive mechanism must be provided for the feeding mechanism, the various spindles, and the traverse or builder motion mechanism for the ring spinners. This drive mechanism is designated in its entirety by the reference character I and is illustrated in full assembly in Figures 1 to 3, inclusive, while the various individual branches extending to the feeding mechanism, the various spindles, and the traverse or builder motion mechanism are illustrated in detail in Figures 7, 11 to 15, inclusive, 24, and 30 to 40, inclusive.

This drive mechanism includes a prime mover, such as an electric motor, which drives an endless belt which is suitably supported and trained over rolls to effect drive of the various spindles through their whirls. The drives for the traverse or builder motion mechanism and the feeding mechanism are of a positive character and receive their motive power from one of the pulleys over which the spindle driving belt is trained. This character of drive possesses marked advantage over the conventional drives for spinning frames now on the market. This is due to the fact that in the present drive mechanism, any slippage which occurs between the pulley of the driving motor, or other prime mover, and the spindle driving belt affects the traverse or builder motion mechanism and the doubled strand feeding mechanism to the same extent as such slippage affects the drive of the various spindles. In spinning frames now in common use by the industry, the drive for the various spindles is independent of the drive for the traverse or builder motion and the feeding mechanism so that slippage may occur in the spindle drive while the drive for the traverse or builder motion mechanism and the feeding mechanism may remain normal. This variance in driving conditions in the spinning frames now on the market results in the production of imperfect wind on the spools or bobbins as well as slack twist.

The operation of this machine results in the production of a finished headless package which is formed by a series of cycles, as distinguished from a single cycle build which is commonly used in the present day forms of coning, copping, and quilling machines. A far superior form of finished headless package is produced by the traverse or builder motion mechanism embodied in this machine. The finished headless package and the method of building the same is very clearly, diagrammatically illustrated in Figures 41 and 42 and is designated in its entirety by the reference character K.

A detail description now will be given of the various elements which form the different mechanisms or parts of the entire machine.

Main or base frame

Referring particularly to Figures 1, 2, and 3, the reference character 1 designates the end frame members. Each one of these end frame members consists of the perpendicular bars 2, 3, 4 and 5. A transverse bottom brace bar 6 interconnects all of the vertical members 2 to 5, inclusive. A transverse upper brace member 7 also connects the perpendicular members 2 to 5, inclusive, at their upper ends. Centrally of the end frame member is a vertically extending bracket 8 which is offset laterally of the plane of the main body portion of the frame member. This offset bracket 8 is provided at its upper end with a bearing 9 to receive a shaft of the driving mechanism, which will be described in detail at a later point.

Located laterally of each side of the bracket 8 are the additional upstanding brackets 10 which are provided at their upper ends with openings 11 to receive the longitudinally extending rods 12. These rods function to tie the end frame members together and to support portions of the driving mechanism for the feed rolls.

Projecting outwardly at each side of each end frame member is a bracket arm 13 to which are clamped, or otherwise suitably secured, the pair of rods 14 which collectively function as a spindle supporting rail.

Projecting upwardly from each bearing portion 9 of each end frame member is a seat 15 for the two longitudinally extending rods 16 which function throughout the length of the frame to support the strand supply mechanism B. These rods or rails 16 are clamped to the seat 15 by the top plates 17.

A longitudinally extending rod 18 is provided at each side of the main frame and is fastened thereto by suitable brackets 19. These longitudinally extending rods or rails 18 not only function to tie the end frame members together but also function to support transversely extending rock shafts which function as a part of the traverse or builder motion mechanism. These shafts will be described in detail at a later point.

Figures 2 and 3 illustrate the end frame members as being provided with adjustable feet 20 which may be employed for properly leveling the frame.

The intermediate frame members or castings 21 are spaced from each other any desired distance and are distributed throughout the length of the main frame to provide proper support for the various longitudinally extending tie rods, rails, or the like. Figure 2 illustrates each one of these intermediate frame members 21 as being provided with a suitable supporting bracket and clamp 21a for receiving the longitudinally extending rods 14 which function as spindle rails on each side of the main frame. Adjustable feet 20 are provided for each side of each one of the intermediate frame members 21.

Figure 3 discloses the upper portion of each intermediate frame member 21 as being formed with an arched crown or top rail 22 which is of greater length than the normal width of the frame and is provided with downwardly and inwardly extending branches 23 employed for mounting the top rail or crown 22 on the side portions of the frame. These branches 23 are positioned sufficiently outwardly of the sides of the main frame to permit the spindle driving belt, to be described in detail at a later point, to be operatively arranged with reference to the various spindles.

In Figures 1 to 3, inclusive, one of the end frame members 1 and the adjacent intermediate frame member 21 are illustrated as having secured thereto the longitudinally extending, channel shaped track members 25 which will be described at a later point as functioning to adjustably support the electric motor employed for driving the various mechanisms.

In Figures 4 to 6, inclusive, there is illustrated a modified form of end frame member. In this form the lower or main portion 26 of the member is provided with a top rail 27 and the four perpendicular rails 28, 29, 30, and 31. The top rail 26 has formed in its opposite end portions the horizontally elongated apertures 32 which are employed for receiving mounting bolts or the like by means of which the spindle driving belt pulleys may be mounted on the end frame members and adjustable transversely thereof. The outer perpendicular members 28 and 31 are provided with vertically elongated slots 33 which function to receive securing bolts for connecting the spindle rail mounting brackets to the end frame members. Apertures 34 are formed in the two intermediate vertical members 29 and 30 for receiving securing bolts, or the like, for mounting the electric motor supporting tracks or rails on said frame member.

Suitably connected to the intermediate portion of the top rail 27 is an angular bracket 35 which provides a mounting at its upper end, offset longitudinally of the complete frame, for a crosshead 36 which is bolted to the angular bracket 35, as at 37. This cross-head 36 has openings 38 for receiving the ends of longitudinally extending rods 39 which function as supports for the doubled yarn feeding mechanism which will be described at a later point.

In Figures 5 and 6, the bolts 37 are illustrated as further functioning to secure to the perpendicular bracket 35 a further bracket arm 40 which is provided at its upper end with a seat 41 for receiving a lower mounting block 42. This lower mounting block is notched as at 43, see Figure 4, for receiving the pair of rods 44 which extend longitudinally of the complete frame and are adapted to have mounted thereon the supply bobbin or spool supporting creels. Figure 6 also illustrates the rod 44 as being tied down to the block 42 by means of a top clamp member 45 which is held in place by the bolt 46.

Clamped to the rod 44 to depend therefrom is a shaft hanger 47 which functions to support the shaft 48 which will be described at a later point as constituting a common drive shaft for the various feeding mechanisms. The shaft 48 is supported throughout its length by a suitable number of shaft hangers 47. Each shaft hanger includes a pair of clamping plates 49 which are located on opposite sides of the longitudinal rod 44. Located below the lower plate 49 is an additional plate 50 which is connected to the upper plate 49 by means of a bolt 51. Adjusting screws 52 are employed for adjusting the position of the plate 50 with reference to the plate 49. These screws 52 are adjustable to effect leveling and lining up of the drive shaft 48.

*Single end or composite strand supply*

In Figures 1, 2, 3, and 7 the supply mechanism B is illustrated as consisting of a suitable number of creels 55 which consist of vertically extending rods having spaced longitudinally therefor a suitable number of bobbin or spool supporting pins 56. The vertical pin supporting rods are suitably bolted at their lower ends to the upper members 57 of mounting clamps 58. These mounting clamps or brackets are connected to the longitudinally extending rods 16 of Figure 3 and the longitudinally extending rods 44 of Figures 4 to 6, inclusive, depending upon which form of frame is employed. It will be explained at a later point that these mounting brackets or clamps 58 further function as supporting means for the feed roll driving mechanism to be later discussed.

The upper ends of the various perpendicular bobbin pin carrying bars are suitably connected to a longitudinally extending rail 59. This rail is braced transversely of the frame by the tie rods 60 which are connected at their outer ends to the upper ends of the tension bars, to be described in detail at a later point.

Figures 3 and 7 illustrate some of the single end strand supply bobbins or spools as being mounted on the pins 56. These two figures also illustrate the strands as being delivered axially of the ends of the bobbins. The single end strands are fed off of the supply bobbins without any appreciable amount of pull or tension being applied thereto. By observing these single end strands, it will be seen that they appear to float off of the bobbins and flutter or have a wavy appearance in the space between the discharge ends of the bobbins and the tensioning mechanism which next receives the single end strands.

*Single end strand tensioning mechanism*

Referring particularly to Figures 2, 3, 7, 8, and 9, there is disclosed a tensioning unit for each one of the creels 55, and each unit includes a separate tensioning device for each bobbin or spool supporting pin 56.

Each tensioning unit is made up of a composite bar formed of right angularly arranged, elongated plates 61 and 62 which are interconnected and held in proper relative position by a plurality of angle straps 63. The plate 61 is connected to the several straps 63 by means of rivets 64. The plate 62, however, is connected to the various straps 63 by means of bolts and nuts 65 and insulator sleeves and washers 66 to electrically insulate the plates 61 and 62 from each other.

Figures 7 and 8 illustrate the plate 61 as having formed therein an aperture 67 which is substantially axially aligned with a bobbin supporting pin 56. One of these holes or apertures 67 is provided for each one of the pins 56.

A single strand of wire 68 is properly bent to form a plurality of longitudinally spaced, substantially V-shaped loops 69. One end portion of this strand 68 is coiled at 70 to receive a bolt 71 which is employed for fastening the strand of wire to the plate 62 at a point sufficiently above the aperture 67 associated therewith so as to line up the free end portions of the several loops 69 with the said aperture. A nut 72 is threaded on the bolt 71 to enable the latter to be tightened for clamping the coiled portion 70 of the strand of wire sufficiently to hold this entire wire unit against vertical movement.

A second strand of wire 73 is properly bent to form a series of longitudinally spaced loops 74 which are of the same shape as the loops 69. The various loops 74 are staggered with respect to the loops 69, as best illustrated in Figure 8.

One end portion of the wire strand 73 is coiled, as at 75, to provide what may be termed a hub portion to be mounted upon the bolt 76 which is fastened to the plate 62. An extremity 77 of the strand 73 projects laterally from the bolt 76 in the manner best illustrated in Figures 8 and 9. A light coil spring 78 is suitably connected at one end to the hub or coiled portion 75 of the wire strand 73. The second end of this light coil spring 78 is connected to a sleeve 79 which is mounted upon the bolt 76. A set screw 80 is threaded in the sleeve 79. By means of this coil spring 78, sleeve 79, and set screw 80, proper tension may be placed upon the coiled hub portion 75 of the strand of wire 73 so that this strand of wire will normally occupy the position shown in the lower portions of Figures 8 and 9. When in this position, the extremity 77 of the wire strand engages or contacts with the plate 61. The bolt 76 and the strand of wire 73 are not insulated from the plate 62 so that an electrical connection is established between the normally insulated plates 61 and 62 when the terminal or extremity of the strand of wire 73 engages the plate 61.

Figure 8 clearly illustrates in full and dotted lines the action of the tension mechanism to impose a uniform tension on the single ends regardless of variations in tension imposed on the strands as they leave the supply bobbins. The lower tensioning mechanism of this figure illustrates the position assumed by the lower member 73 when a strand has broken. The upper tensioning mechanism of this figure illustrates in dotted lines one of an infinite number of positions that may be attained by this member during the normal operation of the mechanism. The full line position of the member 73 in this upper tensioning mechanism illustrates a condition where all tension imposed by the tensioning mechanism has been removed from the single end by the member 73.

It will be noted in the dotted line position that the inner loop 74 of the member 73 has been moved into a position relative to the inner loop 69 of the member 68 so that the single end strand passes straight through these two inner loops. The remaining loops 74 of the lower member 73 are arranged at progressively different distances from the corresponding loops 69 of the upper tensioning member 68 and with the outer loops 69 and 74 being spaced the greatest distance. These variations in distances between the respective loops result in different degrees of tension being imposed on the single end strand by the respective pairs of loops 69 and 74. The greater the distance between adjacent pairs of opposed loops, the greater the degree of tension.

It will be apparent, therefore, that as the lower member 73 moves upwardly from the dotted line position toward the full line position, successive pairs of loops 69 and 74 will be brought into alignment, and as a pair of opposing loops is brought into alignment, the tension formerly imposed upon the single end strand by those loops is removed. The removal of tension imposed upon a single end strand, by bringing into alignment pairs of opposed loops, may continue until all of the opposed pairs of loops are brought into alignment, as illustrated in full lines in this figure.

The fundamental purpose of this tensioning mechanism is to assure at all times a uniform tension being imposed upon the single end strands. If the tensioning mechanism were not automatically variable, as explained above, variations in tension imposed upon the single end strand by variations in conditions under which the strand leaves the supply bobbin would not be compensated for. With this tensioning mechanism, as greater tension is imposed upon a single end strand as it leaves its supply bobbin, the tension imposed upon that strand by its tensioning mechanism is lessened in direct proportion to the increase in tension at the bobbin. This lessening in tension imposed by the tensioning mechanism continues until no tension is provided by the mechanism, and if that action does not constitute a sufficient relief for the tension condition, the strand will break.

Figures 3, 7, and 8 illustrate the various single end strands as leaving their respective tensioning devices and extending vertically to travel through a porcelain condensing eye mounted at the upper end of the composite tension bar formed by the plates 61 and 62. The porcelain condensing eyes for the various tensioning mechanisms are designated by the reference character 81 in Figures 3 and 7.

Figures 3, 7, 8, and 9 clearly illustrate the lower end of each one of the composite tension bars as being connected to and electrically insulated from an arm 82 which forms a part of the doubled strand feeding mechanism, to be described in detail at a later point.

Doubled strand feeding mechanism

The doubled strand feeding mechanism is very clearly illustrated in Figures 1, 2, 3, 7, and 10 to 13, inclusive. Referring particularly to Figure 10, there is illustrated in detail a feed roll. This feed roll is shown in Figures 11 and 13 as being fixedly mounted upon a stub shaft 83. The shaft is connected at one end to a radially extending web 84 which is provided with relatively large apertures or openings 85 to reduce as far as possible the weight of the feed roll. It might be stated at this time that this feed roll is die-cast from aluminum and is preferably approximately five inches in diameter. The periphery of the feed roll is provided with three or more channels 86 which are separated from each other by ribs 87. The channels 86 are formed with flat bottom and side walls. Figure 10 illustrates the bottom wall of each channel as having formed therein a cut-out 88. As will be later explained, the doubled strands are to be wrapped around the feed roll with one wrapping positioned within each one of the channels 86. The cut-outs 88 are provided to permit an operator to employ a small pair of scissors, customarily carried by each operator, to cut from the roll the composite yarn that may accumulate thereon when a break occurs intermediate the roll and the package.

Formed as a part of the mounting for the feed roll shaft 83 is an upstanding arm 89. Mounted on this arm 89 to overlie the periphery of the feed roll is a thread guide 90. This thread guide is shaped to provide a substantially U-shaped thread guiding portion 91 which is located adjacent the mounting arm 89 and a plurality of spirally arranged turns or loops 92 which are properly spaced to form between the same yarn guiding portions. This thread guide is arranged so that the U-shaped guiding portion 91 overlies one end channel 86, and the spaces or portions between the three spirally formed loops 92, said spaces being two in number, overlie or register with the remaining two channels 86 formed in the periphery of the feed roll.

The doubled strands of single ends are led downwardly from the condensing eye 81 and are passed through the U-shaped guiding portion 91 to be wrapped once around the feed roll within the channel underlying this guiding portion 91. The next wrap of the composite single end strands lies in the middle channel 86 and extends completely around this channel to be passed over the coiled portion 92 of the guide 91 between the inner two turns or loops. The third wrap of the yarn around the feed roll is laid in the outer channel 86 and extends completely around the roll in this channel. At the upper side of the roll, this final wrap of the yarn is passed over the thread guide 90 between the middle and outer turns or loops 92. From this thread guide, the yarn is trained in the outer channel 86 and leaves the periphery of the feed roll to extend downwardly to the ring spinner mechanism next to be described. It has been determined that by chromium plating the periphery of the feed roll, feeding of the yarn is effected with less tendency to stretch and thereby deform the yarn.

*Ring spinner and spindle mechanism*

Figures 1, 2, 3, and 11 disclose the ring spinner and spindle mechanism. Figures 3 and 11 disclose the composite yarn as leaving the periphery of the feed roll and extending downwardly through a porcelain guide 93 which is carried by a stop motion rod 94, to be described in connection with the stop motion mechanism at a later point.

The composite yarn, after leaving the thread guide 93, is passed through the traveler of the ring spinner 95.

The construction of the traveler and the spinner ring per se is of conventional design with the exception of the manner of mounting or supporting the ring. In most if not all combined doubling, twisting, and/or spinning frames now in general commercial use, the spinner ring is mounted upon a heavy, solid, plate or rail which is of greater horizontal width than the diameter of the ring. In the construction embodying this invention, the ring per se, on which the traveler moves, is clamped in an aluminum casting 96. This aluminum casting is provided with a mounting web or flange 97 which projects laterally in the plane of the body of the casting. A mounting bracket 98 is adapted to be suitably, detachably secured to the flange 97 and in turn is adapted to be adjustably connected to a ring rail or rod 99 which extends longitudinally of the frame and is actuated by the traverse or builder motion mechanism to be described at a later point.

The action of the ring spinner, of course, builds the desired package on a quill or cop, a cone, or the like, mounted on the spindle 100. This spindle is provided, in a conventional manner, with a whirl 101. The spindle and whirl are mounted on a supporting swing 102 which is journaled for pivotal movement on the bearing post 103. The swinging movement of the element 102 with the spindle and its whirl effects movement of the whirl into and out of engagement with the spindle driving belt, to be described in detail at a later point.

The bearing post 103 is provided with a supporting base 104 which is clamped to the spindle rail previously described as consisting of the pair of tubular rods 14. The clamping of the base 104 to the spindle rail is effected by the clamping plate 105 with the nut and bolt connector mechanism 106.

A fixed brake 107 is mounted in an upstanding post 108 carried by the base 104. For the purpose of urging the spindle whirl 101 into driving engagement with the spindle belt, a spring 109 is interposed between the base portion 108, which supports the brake 107, and a part carried by the swing 102.

The stop motion rod 94, referred to above in connection with the thread guide 93, is pivotally connected to the base 104 of the spindle mechanism by means of the bearing bolt 110. Figure 2 discloses the swing 102 as being provided with an arm 111 which projects longitudinally of the machine and is in the path of movement of the stop motion rod 94 when the latter is pivoted around the mounting 110 provided for the same. This movement of the stop motion rod 94 will be described in detail in connection with the stop motion mechanism. It is to be understood at this point, however, that this swinging or pivotal movement of the rod 94 causes the spindle swing 102 to be moved around the mounting post 103 to move the spindle whirl 101 out of driving relation with respect to the spindle belt and into operative engagement with the brake 107. This engagement of the spindle whirl with the brake instantly stops the spindle.

*Traverse or builder motion for ring spinner*

Figures 1 to 3, inclusive, 11, and 14 to 21, inclusive, disclose in detail the various features of the traverse or builder motion mechanism.

It was stated in connection with the ring spinner mechanism E that the various rings were mounted upon the single rod, located on each side of the main frame, which constituted the ring rail. Figure 19 discloses in detail one ring rail 99 as being supported by and secured to an angle bracket 112. The remaining end of this angle bracket 112 is adjustably connected to a perpendicular rod 113 which is journaled for vertical reciprocatory movement within the space bearing portions 14 of an angle bracket 115 which is clamped by means of the arm 116 to the spindle rail 14.

By inspecting Figures 1, 2, and 3, it will be determined that a suitable number of vertically reciprocating rods 113 are provided to properly support the ring rail 99 on each side of the frame.

Figures 2 and 3 disclose each one of the perpendicular rods 113 as having mounted on its lower end a thrust or bearing head 117. Engaging the end surface of this head 117 is a roll 118 carried by the arm 119 of a bell crank lever 120.

Each one of the bell crank levers 120 is mounted on a rock shaft 121 which extends transversely of the frame and is journaled in suitable bearings mounted on the longitudinally extending brace rods or rails 16 carried by the various frame members 1 and 21. The second branch or arm 122 of the bell crank lever 120 is suitably, pivotally connected to an actuating rod 123 which extends longitudinally of the frame at a point comparatively close to the floor line. Each bell crank lever 120 also has attached thereto, in any suitable manner, an arm 124 which carries an adjustable counterweight 125.

To review the portion of the traverse or builder motion mechanism so far described, it will be stated that the ring spinners for the various spindles are supported in longitudinally spaced relation along each side of the main frame by means of the longitudinally extending spindle rails 99. These rails are supported at suitable points throughout their length by the vertically extending rods 113. Each vertical rod 113 is actuated by and supported upon an arm 119 of a bell crank lever 120. It will be understood that the vertical rods 113 for each ring rail 99 are arranged in transversely aligned pairs; that is, each vertical rod 113 on one side of the frame is transversely aligned with a corresponding vertical rod on the other side of the frame. This transverse alignment of the vertical rods 113 results in transversely aligning the pivot axes of the various bell crank levers 120. A single transverse rock shaft 121, therefore, functions to interconnect two bell crank levers 120 with these two levers arranged on opposite sides of the main frame. The transversely extending rock shafts 121, therefore, couple the ring rails 99 on both sides of the frame so that both rails move in unison. Each one of the levers 120 on both sides of the frame is provided with the counterweight 125 and its supporting arm 124. The levers 120 on only one side of the frame, however, are provided with the depending branches 122 which are connected to the longitudinally extending actuating rod 123. The side of the frame having the depending arms 122 for the levers is illustrated in Figure 2. Figure 3 discloses in end elevation the remaining side of the frame. It will be noted that the depending arms 122 are not shown on this second side of the frame.

It has been explained above that the transverse shafts 121 couple the ring rails 99 so that both rails will operate in unison. The longitudinally extending actuating rod 123, provided on the side of the machine presented in Figure 2, assures uniform actuation of all of the levers 120. Operation of the connector rod 123, therefore, will operate both ring rails 99 and all of the ring spinner devices in unison.

Figure 17 illustrates the form of connection provided between the lever arms 122 and the connecting rod 123. At each point in the connecting rod 123 where a lever arm 122 occurs, the rod 123 is broken, and each end is connected, as by screw threads or the like, to a double ended yoke 126. Intermediate the ends of this yoke 126 are positioned pivot pins 127 which are sharpened or pointed at their inner ends to be received in sockets 128 formed in opposite faces of the end portion of a lever arm 122. Lock nuts 129 are provided for the pivot pins 127 to maintain proper adjustment on these pins.

In Figures 2 and 16, there is disclosed the final section 123a of the connecting rod. This section is adjustable in length and connects the rod 123 to the operating lever of the traverse or builder motion. In Figure 16, the connector rod 123 is illustrated as being threadedly connected to an open-ended yoke 130. This yoke 130 is pivotally connected to one of the lever arms 122 by the same pivot pin mechanism illustrated and described in connection with Figure 17. The same reference characters, therefore, will be employed for these elements.

The open end of the yoke 130 is provided with a pivot pin 131 on which is pivotally mounted a coupler member 132. A threaded rod section 133 is attached by means of the set screw 134 to the coupling member 132. A sleeve 135, having internal right and left-hand threads, is connected to the rod 133 at one end and to a second rod 136 at its remaining end. The second end of the rod 136 is threadedly connected to a coupling lug 137 which in turn is pivotally connected, by the pivot bolt 138, to the operating lever 139 of the traverse or builder motion, to be described in detail at a later point. Figure 2 clearly illustrates the fact that the pivot bolt 138 is adjustable relative to the length of the operating lever 139 by means of the elongated slot 140.

A more detailed description of the type of package formed and the character of wind produced to provide such a package will be given at a later point. It will be stated at this time, however, that the package is wound by means of a plurality of cycles with each cycle consisting of a desired number of traverses of uniform length or stroke and with each successive traverse of each cycle being advanced relative to the preceding traverse and with reference to the length of the package. Each cycle consists of advancing the traverse a desired number of times in one direction through a portion of the cycle and then retracting the traverse stroke to or substantially to the starting point of the first traverse or stroke to complete the cycle.

The adjustment accomplished by rotation of the sleeve 135 in opposite directions is to vary the starting point of the various cycles with reference to the length of the cone, or the like, on which the package is formed. A heart-shaped cam, to be described at a later point, determines the length of each stroke or traverse. Of course, different sized heart cams may be employed for varying the length of the strokes or traverse. With any given heart-shaped cam, however, different length strokes may be provided by adjusting the pivot pin 138 relative to the length of the lever 139 through the medium of the slot 140 which receives the said pin.

Figure 18 illustrates in detail the manner of supporting the various transverse rock shafts 121 on the frame rail 18. A two-part split clamp receives the frame rail 18 and consists of the main clamp part 141 which has a shaft bearing portion 142 formed on one end thereof and an apertured ear 143 formed on its remaining end portion. The intermediate part of this clamp member is curved to receive approximately half of the rail 18. The second clamp part 144 has a lug 145 formed at one end to be received within a notch 146 formed on the first mentioned clamp member 141. The remaining end of the clamp member 144 is provided with an apertured ear 147. By employing a bolt and nut 148, the apertured ends 143 and 147 of the clamp parts may be drawn together to tightly fasten the clamp to the rail 18. The bell crank lever 120 is suitably fastened or keyed to the rock shaft 121 by means of the set screw 149.

The traverse or builder motion per se is illustrated in detail in Figures 14 and 15 and will be described with reference to these two figures. A frame bar 150 is illustrated as being bolted to the upright member 4 of the adjacent end frame member 1. This frame bar 150 extends to and is connected in any suitable manner to the adjacent intermediate frame member 21. Suitably bolted to one side of the frame bar 150 is a casting 151 which has formed thereon the two arms 152 which carry the bearing portions 153. A stub shaft 154 is journaled in the bearing portions 153 and has suitably keyed thereto a sprocket 155. One end of the stub shaft 154 projects beyond one of the bearing portions 153 to have keyed thereto a beveled pinion 156. Meshing with the pinion 156 is a beveled gear 157 which is suitably keyed to the shaft 158. The drive for the traverse or builder motion per se constitutes the elements just described, the drive entering the said motion at the sprocket 155.

The shaft 158 is journaled in a bearing 159 which is suitably fastened to the outer face of the perpendicular end frame member 4. This shaft 158 has keyed to its end a heart-shaped cam 160. Inwardly of the heart-shaped cam, the shaft 158 has keyed thereto a sprocket wheel 161. Trained over the sprocket wheel 161 is a sprocket chain 162 which extends to and is trained over a sprocket 163 formed integrally with or as a part of a sleeve 164 supported on a rock shaft 165. This rock shaft is journaled in the bearings 166 and 167 supported by the frame bar 150 and brace rail 18, respectively. The sleeve 164 is loosely mounted on the rock shaft 165 by means of the bearing sleeve 168.

A worm 169 is formed integrally with the sleeve 164 and meshes with a worm wheel 170 keyed to one end of the shaft 171 which is journaled in the bearings 172 formed on the arm 173. This arm is provided with a hub portion 174 which is loosely mounted on the rock shaft 165.

The extremity of the arm 173 has fastened thereto a pin 175 which carries a concentric, circular roll 176 positioned to ride on the cam surface of the heart-shaped cam 160. Inwardly of the pin 175, the arm 173 has a bearing boss 173a formed thereon for the reception of the stub shaft 177. Mounted on one end of this stub shaft is a half-heart or builder cam 178, the contour of which is clearly illustrated in Figure 14.

The remaining end of the shaft 175 has keyed thereto a worm wheel 179 which meshes with a worm 180 keyed to the end of the previously referred to stub shaft 171.

The half-heart or builder cam 178 is engaged by an octagon shaped or eight-sided eccentrically mounted cam 181 which is carried by a pin 182 mounted on the free end of the arm 183 which is keyed to the rock shaft 165, as at 184. Figure 15 discloses the fact that this rock shaft 165 has fastened to its outer end the actuating lever 139 which is connected to the mechanism employed for transmitting the action of the traverse or builder motion to the ring rails 99.

It has been explained above that the drive for the traverse or builder motion per se is delivered directly to the shaft 158 by means of the beveled pinion and gear set 156—157. The heart-shaped cam 160 is directly driven by the shaft 158. The sprocket wheel 161 also is directly driven by this shaft. The two half surfaces of the heart cam 160 are, of course, equal in length and determine the length of stroke or traverse of the ring spinner relative to the building package. The action of the heart cam 160 is delivered directly to the arm 173. The stroke of the arm 173, therefore, is equal to the length of each half of the cam surface of the heart cam 160.

The sleeve 164 is driven by the chain 162 from the sprocket wheel 161. This sleeve 164 also drives the shaft 171 which in turn drives the half-heart or builder cam 178. This drive from the shaft 158 to the builder cam 178 effects a ratio of drive of 36 to 1 between the heart cam 160 and the builder cam 178. The drive for the builder cam 178 results in superimposing the action of the builder cam 178 on the action of the heart cam 160.

As the builder cam 178 actuates the rock shaft 165 through the medium of the octagon or eight-sided, eccentric cam 181, the action of this latter cam also is superimposed upon the builder cam 178 and the heart cam 160. The action produced by the builder cam 178 and the octagon cam 181 now will be described.

By considering Figure 14, it will be noted that the curved cam surface of the builder cam 178, designated by the reference character 185, progresses away from the axis of the cam starting with the inner end 186 and continuing to the outer end or tip 187. These two extremities of the cam surface 185 are connected by a straight surface 188 which extends substantially tangentially of the axis of the cam.

The octagon shaped or eight-sided cam 181 is clearly illustrated in Figure 14 as being eccentrically mounted on the end of the arm 183. Starting with the juncture point between the inner end of the curved cam surface 185 and the inner end of the straight cam surface 188, one of the eight sides or faces of the octagon cam 181 will remain in engagement with the curved surface 185 of the builder cam 178 throughout its entire travel over the curved surface. When this octagon cam reaches the point or juncture 187 between the outer end of the curved cam surface 185 and the outer end of the straight cam surface 188, the octagon cam rocks around the tip 187 and maintains the same face of the octagon cam in engagement with the cam surfaces of the builder cam 178. That is, the same face of the octagon cam 181 which engaged the curved surface 185 of the builder cam 178 also engages the straight surface 188 of the builder cam. The octagon cam 181, however, has been caused to rotate slightly relative to its supporting pin 182. When the octagon cam 181 reaches the point 186, or the juncture between the inner end of the curved cam surface 185 and the inner end of the straight cam surface 188, the octagon cam 181 is caused to further rotate on its pin 182 and presents a new face to the starting point of the curved surface 185 of the builder cam. This shifting to a new face of the octagon cam 181, which face is located at a different distance from the axis of the octagon cam than that of the previous face, locates the axis of the octagon cam a different distance from the surface of the builder cam 178 and, therefore, locates the lever arm 183 in a different range of movement relative to the lever arm 173.

It will be appreciated, therefore, that the range of movement of the lever arm 183 will be changed eight times with reference to the lever arm 173 during a complete revolution of the octagon cam 181. Also, the axis of the octagon cam 181 will be arranged in five different positions relative to the surface of the builder cam 178. The diametrically opposite surfaces which are arranged closest to and farthest from the axis of the octagon cam supporting pin 182 represent the inner and outer dead center positions of the octagon cam. Each one of the three remaining faces on one side of the cam corresponds with one of the three remaining faces on the other side of the cam so that three positions of the axis of rotation of the octagon cam are represented by the six side faces of the cam, and two additional positions of the axis of rotation of the octagon cam are represented by the extreme inner and outer faces.

As has been stated above, the heart cam 160 governs the stroke or traverse of the ring rail relative to the building package. One-half of the surface of the heart cam 160 represents the stroke of the ring rail in one direction while the remaining half of the heart cam surface represents the return stroke of the ring rail. With the ratio of 36 to 1 existing between the heart cam 160 and the builder cam 178, the ring rail will complete thirty-six up and down strokes for each revolution of the builder cam 178. Superimposing the action of the builder cam 178 on the action of the heart cam 160, however, causes each one of the successive up-strokes of the ring rail to be started at a different position relative to the length of the cone, or the like, on which the package is being built. The shifting of the starting point of the up-strokes will continue throughout the entire travel of one face of the octagon cam 181 over the curved surface 185 of the builder cam 178. When the octagon cam leaves the curved surface 185 of the builder cam and engages the straight surface 188 of the latter cam, the starting point of the down-strokes will be rapidly shifted downwardly of the package.

One complete cycle, therefore, is represented by or effected by one complete rotation of the builder cam 178. The curved and straight surfaces 185 and 188 of the builder cam are so proportioned that during the thirty-six revolutions of the heart cam during one revolution of the builder cam, thirty-two strokes will be produced while the octagon cam is in engagement with the curved surface 185, and four strokes will occur during engagement of the octagon cam with the straight surface 188. The curved surface 185 of the builder cam 178, therefore, produces a comparatively slow upward progression of the successive strokes while the straight surface 188 produces a very rapid downward progression of the strokes.

The function of the octagon cam 181 is to cause the first stroke of each succeeding cycle to be started at a different point relative to the length of the building package. As stated above, five different starting points will be provided by the eight-sided or faced cam 181.

*Character of finished package and method of building the same*

Figures 41 and 42 illustrate diagrammatically the character of package being produced, the type of wind employed for producing the package, the character of cycle resulting from the operation of the heart cam 160 with the builder cam action superimposed thereupon, and the changing of the starting point of the successive cycles which results from the action of the octagon cam 181 when superimposed upon the action of the builder cam 178 and the heart cam 160.

Each one of the lines 189 in the chart shown in Figure 41 indicates an up or down stroke of the ring rail with said up and down strokes being produced by the action of the heart cam 160.

It will be noted that each successive stroke 189 starts at a new position relative to the length of the final package. Thirty-two of the strokes are progressively advanced upwardly of the package. This progressive advancement of the strokes is produced by the action of the curved surface 185 of the builder cam 178. The remaining four strokes of a single cycle are progressively stepped downwardly with reference to the length of the package, and this downward progress results from the action of the straight surface 188 of the builder cam. It has been stated above that the heart cam 160 rotates thirty-six times to one revolution of the builder cam 178. These thirty-six revolutions of the heart cam 160 are divided in the manner illustrated in the chart of Figure 41.

The upward advancing of the strokes is very gradual as compared to the downward or return progression of the strokes.

Upon the completion of thirty-six revolutions of the heart cam 160, the builder cam 178 will rotate sufficiently to effect a change of one surface of the octagon cam 181. This change in surface of the octagon cam causes the first stroke of the next succeeding cycle to be started at a different point, relative to the length of the package, than the starting point of the first stroke of the preceding cycle. Stroke 189a illustrates this change in starting point.

In Figure 42, the octagon cam 181 is illustrated with its eight sides or faces consecutively numbered 1 to 8, inclusive. The low side of the cam bears the number 1 while the high side of the cam bears the number 5. Beneath this representation of the octagon cam are arranged five parallel lines which represent the successive changes produced by the eight faces of the octagon cam during one complete revolution of this cam. These five horizontal lines indicate the five different starting points for eight successive cycles. The eight vertical lines in Figure 42 are intended to represent the first stroke of each one of the eight successive cycles. It will be noted that the first stroke of cycles 2 and 8 start at the same points relative to the length of the package. The first strokes of cycles 3 and 7 also start at the same point while the starting point for the first stroke of cycles 4 and 6 is the same. The starting point for stroke 1 for each of the cycles 5 and 1 represents the extreme limit for each series of eight cycles.

The package, designated by the reference character 190, has projected to one side of each of the heel and toe portions five lines bearing designating numbers 1 to 5, inclusive. These five lines represent the extreme points of engagement of the yarn in each cycle and in the several cycles of a complete series produced by one revolution of the octagon cam 181. The complete cycle represented by the chart in Figure 41 corresponds with the cycle produced by surface numbered 3 on the octagon cam. Cycle number 4, which is produced by surface numbered 4 on the octagon cam, also is partially represented in Figure 41.

It will be appreciated that a truly cylindrical, concentrically mounted roll could be employed in place of the octagon cam 181. Such a roll, however, would not effect shifting of the starting point of successive cycles and would result in the production of lumps at both the heel and the toe of the package as well as points 191 and 192. The production of lumps at these four points in a package presents a serious defect which manifests itself when the yarn is unwound from the package. This becomes apparent when it is considered that a lump on the surface of a building package causes a wrap or wind which is placed on the lump to roll in one direction or the other lengthwise of the package, with the result that one or more wraps of a succeeding layer may oftentimes be covered by a wrap of a preceding layer. The natural result is that the tied down wind or wrap will not unwind freely, and the yarn will break at that point.

The package 190 is of the type commonly identified in the industry by the expression "barrel." The "barrel" type of package differs from the "pineapple" package in the difference in length of the conical end portions. The "pineapple" package has shorter conical end portions. It will be appreciated that by changing the shape of the builder cam 178, a "pineapple" package, as well as many other different shaped packages, may be produced.

It will be appreciated that the speed of reciprocatory movement of the ring rails 99 determines the distance between or pitch of the various wraps or winds placed upon a package during a stroke in either direction of the ring rail 99. In this machine, the speed of travel of the ring rail 99 is such that a very open wind or large pitch is provided. This large pitch produces a "diamond" wind and permits the yarn to be unwound from the package without any breakage which results from a close wind or a wind with a very short pitch, which breakage results in the latter type of wind from a turn of a preceding layer overlying one or more turns of a succeeding layer.

The representation of a package 190, in Figure 41, has presented thereon the wraps or winds which are produced during a complete up and down stroke of the ring rail. The arrows indicate the direction of wind.

Stop motion mechanism

The stop motion mechanism is illustrated in detail in Figures 1 to 3, inclusive, 7 to 13, inclusive, and 22 to 28, inclusive. Figure 7 illustrates the stop motion mechanism associated with the modified form of frame disclosed in detail in Figures 4 to 6, inclusive. Figure 11 combined with Figure 24 illustrates the stop motion mechanism mounted on the type of frame disclosed best in Figure 3.

Referring first to Figures 11 and 24, there is provided a stop motion supporting arm 82 which is of angle formation in cross-section and includes a vertical web 193 and a horizontal top web 194. The arm 82, at its lower end, is provided with an upstanding lug 195 which has formed therein an elongated slot 196 which extends longitudinally of the arm 82. This slot is adapted to receive a mounting bolt 197 which connects the lug 195 to the apertured ear 198 formed on a clamp member 199. This clamp member is adapted to rest upon and be secured to the longitudinally extending tie rods or rails 16, see Figure 3. A clamping plate 200 with a clamping bolt 201 functions to fasten the member 199 to the rods 16. The slot 196 functions to permit adjustment of the arm 82 in a longitudinal direction. Set screws 202 are carried by the lug 195 and are employed for compensating for irregularities in the apertured ear 198.

At a point intermediate the length of the arm 82, preferably reasonably close to the outer end of the same, the vertical web 193 is provided with a depending lug 203. This lug is apertured to receive the bolt 204 which passes through the slot 205 formed in the upper end of the brace arm 206 which is disclosed in Figure 3 as having its lower end supported on the longitudinally extending rod or rail 12 of the main frame. Set screws 207 are carried by the apertured lug 203 and are adjustable to compensate for irregularities in the brace rod or arm 206. The slot 205, formed in the arm 206 allows for vertical adjustment of the outer end portion of the arm 82.

In Figure 7, the arm 82 is illustrated as having formed thereon an apertured lug 208 which projects upwardly from the lower end of the arm. The aperture of this lug is adapted to receive a fastening bolt 209 which also passes through the slot 210 of the apertured ear 211 which forms a part of the clamp member 58, previously described as functioning to support the creel rod 55. In place of the brace arm 206, disclosed in Figures 3 and 11, the modified form of mounting for the stop motion mechanism disclosed in Figure 7 includes a quickly detachable brace and mounting arm 209a. This brace and mounting arm 209a is disclosed more in detail in Figure 22. It consists of a reversely bent body portion 210a which has a C-clamp 211a at its lower end adapted to partially encircle one of the frame rods or rails 39 carried by the cross-heads 36. A set screw 212 is employed for detachably fastening the C-clamp 211a to the rod or rail 39. The upper end of the body portion 210a is provided with an apertured ear 213 in which is mounted an adjusting screw 214. This adjusting screw is provided with a pointed extremity 215 adapted to be received within a conical socket 216 formed in an enlargement 217 of the arm 82. A lock nut 218 is provided for retaining the supporting screw 214 in desired adjusted position. By means of this adjusting screw 214, the outer end portion of the arm 82 may be adjusted vertically.

The outer end portion of the arm 82 has formed thereon a depending, longitudinally curved finger 219. This finger 219 is illustrated in Figure 13 as having a laterally projecting boss 220 formed thereon for receiving the pivot pin 221. This pivot pin is detachably locked in place by means of the set screw 222. Journaled on the pin 221 is an arm 89 which has formed integrally therewith the bearing boss 224 for the shaft 83 which carries a feed roll. The end of the arm 89 which is journaled on the pin 221 is provided with a relatively large hub portion 225. This hub portion has a laterally projecting web 226 formed integrally therewith. A socket 227 is formed in the web 226 for receiving one end portion of the spring 228. The remaining end portion of this spring is passed through an aperture formed in the finger 219 of the arm 82. The hub 225 of the arm 223 is provided with a recess 229 for receiving the end portion of the boss 220.

Figures 10, 11, and 12 clearly illustrate the upper end portion of the arm 89 as having bolted thereto a bar 230. One end of this bar is provided with an aperture 231 which is countersunk from opposite faces to form an edge or knife-like bearing surface for pivotally engaging the stop motion rod 94 at a point adjacent its upper end. This stop motion rod was referred to in connection with the spindle mounting base 104 and was described as being pivotally mounted on this base by the bearing screw 110.

Figures 11, 12, and 28 clearly illustrate the remaining end of the bar 230 as being offset at 231 to form a seat for the latch member 232. This latch member is pivoted to the offset end portion by means of screw 233 and is provided with an elongated aperture 234 which receives a set screw 235. By manipulation of the set screw 235, the latch member 232 may be adjusted laterally of the bar 230.

Figures 12 and 25 clearly illustrate the arm 82 as having formed near its outer end portion an upstanding ear 236 which is provided with an elongated opening 237. This elongated opening adjustably receives a securing bolt 238 employed for fastening a mounting bracket 239 to the ear 236. The elongated opening 237 functions to permit adjustment of the mounting bracket 239. Figures 11 and 25 clearly illustrate the outer portion of this mounting bracket 239 as having formed thereon a pair of laterally projecting ears 240. Pivotally connected to these ears, as by means of the pin 241, is a casting which is constructed and arranged to function as a latch keeper, a magnet support, and a trip mounting. This casting has the major portion of its length depending from the pivot pin 241. An expansion spring is seated at its opposite end in sockets formed in the extremity of the bracket 239 and the upper end portion of the casting 243. This spring 242 biases the lower end portion of the casting toward the apertured ear 236 of the arm 82. In Figures 11 and 12, the upper end portion of the casting 243 is illustrated as having formed thereon a lateral projection 244 which functions to support the mounting plate 245 of the electro-magnet 246. This magnet has its length extending downwardly toward the arm 82.

Figures 11, 12, and 25 illustrate the intermediate portion of the casting 243 as being formed with a camming surface 247 which cooperates with the outer hooked end of the latch 232 to effect pivotal movement of the casting 243 to permit the latch to ride by the casting and then engage the edge portion 248 of the casting, see particularly Figure 28, for the purpose of holding the arm 89, which carries the feed roll, in the position illustrated in Figures 11 and 12. The spring 228 associated with the mounted end of the arm 89 functions to urge the arm 89 about its pivot pin 221 or outwardly away from the upper end of the arm 82. The engagement of the hooked end of the latch 232 with the edge 248 of the casting 243 restrains the arm 89 from outward movement under the influence of its spring 228. It will be appreciated, therefore, that movement of the casting 243 with its edge 248, which functions as a keeper for the latch 232, will trip or release the latch to permit the spring 228 to throw the arm 89 and its feed roll outwardly about its pivot pin 221.

The lower end of the casting 243 is bifurcated or forked, as at 250, for receiving a combined armature and trip element designated in its entirety by the reference character 251. This combined armature and trip element is illustrated in detail in Figure 26 and is best illustrated in its assembled position in Figure 11. The element 251 is provided with a hub portion 252 which is pivoted to the forked end 250 of the casting. Projecting from one side of the hub 252 is an arm 253 which has embedded therein a mounting bolt 254 for the armature portion 255 which cooperates with the pole piece of the electro-magnet 246. Figure 11 clearly illustrates the armature 255 as being of laminated construction. A nut 256 threaded on the end of the bolt 254 functions to hold the laminated armature 255 in place.

Projecting from the opposite side of the hub 252 is an angular strip finger 257 which, as best illustrated in Figure 11, projects downwardly toward the outer end portion of the arm 82. A web 258 is formed on the same side of the hub 252 as the trip finger 257 and functions to support a stop pin 259. This stop pin functions to engage a projection 260 formed on the casting 243 for limiting the pivotal movement of the combined trip and armature member 251 in one direction, namely, in a direction where the armature 255 moves away from the pole pieces of the electro-magnet 246. The weight of the armature 255 normally maintains the element 251 in this position which is clearly illustrated in Figure 11.

The outer end of the arm 82 has formed thereon a shaft bearing 261. A similar shaft bearing 262 is formed integrally with the inner end of the arm 82. These outer and inner bearings are best illustrated in Figures 11 and 24. A drive shaft for the feed roll is mounted in these bearings 261 and 262 and is designated by the reference character 263. The outer end of this shaft 263 has keyed thereto a beveled pinion 264 which is adapted to mesh with a pinion 265 keyed to the feed roll shaft 83. The hub of the beveled pinion 264 has formed thereon radially projecting ribs 266 which are in radial alignment with the outer end portion of the angular finger 257 formed as a part of the element 251.

It will be appreciated that if the circuit for the electro-magnet 246 is closed, the armature 255 will be attracted by the magnet and will throw the finger 257 downwardly in the path of the projections 266 carried by the driven pinion 264. This engagement of the trip finger 257 with a projection on the pinion 264 will cause the casting 243 to be moved laterally outwardly about its pivot pin 241. This lateral movement of the casting will disengage its keeper edge 248 from the hooked end of the latch 232. As has been explained above, release of the latch 232 will permit the arm 89 to swing outwardly about its pivot pin 221. This outward swinging movement of the arm 89 will disengage the feed roll driving pinion 265 from the pinion 264. Further rotation of the drive roll will be stopped almost instantaneously with energization of the electro-magnet 246. To re-establish drive of the feed roll, it only becomes necessary to manually swing the arm 89 upwardly into the position illustrated in Figure 11, which movement will cause the latch 232 to again engage the keeper edge 248 of the casting 243.

Figures 7 and 11 disclose a stop collar 267 mounted on the stop motion rod 94. This stop collar is engaged by the outer end of the bar 230 when the arm 89 with its feed roll swings outwardly about the pivot 221. This stop collar 267, therefore, limits outward movement of the arm 89.

Figures 7, 11, and 27 illustrate the stop motion rod 94 as having adjustably mounted thereon a coupling arm 268. This coupling arm is maintained in desired adjusted position by means of the set screw 269. A sleeve portion 270 is formed on the coupling member 268 and has adjustably connected thereto, as by means of the set screws 271, a rod 272 which extends to and is connected with a lever arm 273 which is pivotally connected to the arm 82 adjacent its lower end. This lever arm 273 functions to control an electric switch which will be described in detail in connection with the wiring diagram illustrated in Figure 29. This switch forms a control for the electromagnet circuit and is actuated by outward pivotal movement of the stop motion rod 94 when the arm 89 is released to effect disconnection of the feed roll from its drive shaft 263.

*Wiring diagram for stop motion mechanism*

Figure 29 illustrates diagrammatically the circuits for the electro-magnets 246 which are associated with the stop motion mechanism for a few of the feed rolls.

It has been explained above that when an electro-magnet 246 is energized, its associated feed roll is automatically moved to discontinue its drive. The drive to the feed roll is intended to be broken upon severance of one of the single end strands coming from a spool or bobbin. The action which takes place to result in the closing of a circuit for one of the electro-magnets 246 will now be described.

It was explained in connection with the single end strand tensioning mechanism illustrated in detail in Figures 8 and 9 that each single end strand was properly threaded through the loops 69 and 74 of the two tensioning elements 68 and 73, respectively. When a single end strand is being fed from a spool or bobbin through its tensioning mechanism, upwardly to and through the condensing eye 81, and then down to the feeding roll without a break in the strand, the lower tensioning member 73 will be held in the position illustrated in the upper portions of Figures 8 and 9. In this position the terminal 77 of the lower element 73 is spaced from or out of electrical contact with the plate 61. However, when a single end strand breaks, the spring 78 associated with the lower tensioning member 73 moves this member downwardly until the terminal 77 contacts the plate 61. If the plates 61 and 62 are connected to separate leads or lines of an electro-magnet circuit, it will be apparent that the breaking of a single end strand will result in electrically connecting the said leads or lines of the circuit. It remains, therefore, to describe the manner in which plates 61 and 62 are connected in the circuit of a magnet.

The plug 274 is adapted to be connected to supply lines by being plugged into a suitable socket, not illustrated. Extending from the plug 274 to the trickle charger unit 275 is a two-wire cord 276. Leads 277 and 278 connect the trickle charger 275 to the two terminals of a storage battery 279. Leading from one terminal of the battery is a main supply line 280 which is common to all of the electro-magnet circuits. A manual control switch 281 is placed in this line 280 and functions as a master control for all of the electro-magnet circuits. The second terminal of the battery 279 has connected thereto a line 282 which also is common to all of the magnet circuits.

The tension mechanism plate 62 is connected to the main supply line 282, in each one of the magnet circuits, by the branch line 283. That is, each one of the plates 62 on one side of the frame is connected to the main line 282 by a branch line 283. The plates 62 for the tensioning mechanisms on the other side of the frame are all connected to the main supply line 280 by the branch lines 284. Each one of the plates 61 of each one of the tensioning devices is connected to one lead of the electro-magnet coil by a branch wire 285. The second lead or terminal of each electro-magnet 246 is connected by a branch wire 286 to a terminal or contact 287 of a normally closed switch, each one of which includes a second, movable contact 288. On one side of the frame, each one of the movable contacts 288 is electrically connected to the main supply line 280. All of the movable switch contacts 288 located on the other side of the frame are connected to the common supply line 282. The location of this switch, formed by the contacts 287 and 288 and the manner in which this switch is actuated will be described in connection with Figure 7.

The switch contacting members 287 and 288 are illustrated in Figure 7 as being mounted upon a support 289 which is formed of insulating material and is suitably connected to the arm 82. The lever arm 273, which is formed of insulating material and which was previously described as being pivotally mounted on the arm 82 and connected to the stop motion rod 94 by means of the link 272, normally is positioned to cause the contact elements 287 and 288 to be in engagement with each other. When, however, the stop motion rod 94 is pivoted by the outward swinging movement of its respective arm 89 and the feed roll carried by said arm, the lever arm 273 is swung away from the contacts 287 and 288 to permit separation of the same.

It will now be seen that when a feed roll is being driven by its respective drive shaft and all of the single end strands are intact, all of the electro-magnet circuits will be closed at the contacts 287 and 288 but will be broken at the points controlled by the tension device terminals 77. The circuit for no electro-magnet, therefore, will be closed.

When a single end strand breaks, the said mechanism associated with the broken strand operates to close the circuit to the electro-magnet 246 associated with the feed roll mechanism for the broken strand. Energization of the electro-magnet actuates the combined armature and trip element 251 which results in tripping the latch 232 for releasing its particular feed roll to break the drive connection to said roll. This operation takes place before the broken strand will travel through the condensing eye 81 and down to its feed roll. This is due to the fact that such a long stretch of strand is provided between the supply bobbin and the feed roll. When the feed roll for the broken strand is allowed to move outwardly, its associated stop motion rod 94 is actuated and pulls the link 272 longitudinally outwardly to swing the lever arm 273 away from the switch contact elements 287 and 288. The electro-magnet circuit which was closed by the tensioning mechanism of the broken strand will again be broken by separation of the contacts 287 and 288 in that particular circuit.

After the break in the single end strand has been repaired, as by knotting together the broken parts of the strand, the feed roll may be manually returned to its driving position, and the operation at that particular spindle then will proceed as before. The repair of the broken strand returns its particular tensioning mechanism to its normal condition, and the return of the feed roll to its driving position re-establishes the circuit at the contacts 287 and 288.

*Drive mechanism for the several spindles, the feed rolls, and the traverse mechanism*

The drive for all of the various mechanisms is obtained from a single electric motor 289. The motor and its mounting are illustrated in detail in Figures 30 to 32, inclusive. The motor is shown as being supported with its armature shaft extending vertically. One end-bell is provided with four upstanding bolts 291 which are received in radial slots 292 formed in a mounting plate 293. These slots 292 will function to accommodate variations in bolt locations. The mounting plate 293 is of substantially rectangular formation and has a mounting ear 294 formed at each of its four corners. Each mounting ear is adapted to receive a roll shaft 295 on which is mounted a roller 296. The motor supporting rollers are adapted to travel along the tracks 25 which were referred to during the description of the main frame of the machine. Figures 30 to 32, inclusive, disclose the use of mounting lugs 297 for fastening one end of each track 25 to the adjacent frame member 21. Similar mounting lugs may be employed for connecting the remaining ends of the track to the adjacent frame member 1.

The armature shaft 298 has suitably keyed to its upper end a flanged belt pulley 299. The belt trained over the pulley 299 functions to drive all of the spindles and also effects a drive of the remaining mechanisms of the machine. It is essential to be able to tighten or tension the belt driven by the pulley 299. This is accomplished by the tensioning mechanism illustrated in Figures 30 and 31 which functions to move the electric motor 289 along the tracks 25 in the opposite direction to the direction of pull of the belt.

The motor supporting base 293 is provided with an upstanding pin 300 to which is connected one end of a link chain 301 which is trained over a sprocket 302 mounted on a transverse shaft 303 which is journaled in the supporting arms 304 suitably bolted to the frame member 21. The shaft 303 also has keyed thereto a weight arm 305 which is provided with a longitudinal series of notches 306 in its upper edge. A weight 307 is suspended by means of a strap 308 to the lever arm 305. It will be apparent that by shifting the weight supporting strap 308 into different ones of the notches 306, the effective length of the weight or lever arm 305 will be varied, and different mechanical advantages will be obtained. With a chain and sprocket employed as the connecting means between the weight actuated shaft 303 and the motor mounting, the point of connection between the chain 301 and the sprocket 302 may be varied as the belt stretches. The position of the lever or weight arm 305 illustrated in Figures 30 and 31 constitutes approximately the limit of downward movement of the arm before the strap 308 will slip out of its supporting notch. To effect a resetting of the arm 305, the motor supporting plate 293 may be clamped or locked in any desired manner to prevent movement of the same along the tracks 25. With the electric motor restrained against movement, the arm 305 may be elevated and the teeth of the sprocket 302 meshed with links of the chain 301 located closer to the connecting pin 300. The motor mounting plate 293 then may be released, and the weight 307 will again take up the work of maintaining the belt properly tensioned.

By inspecting Figure 1, it will be seen that a pulley is arranged at each one of the four corners of the frame. These pulleys perform two different functions. The pulley designated by the reference character 309 not only functions to support the spindle driving belt 310 but also functions to drive the trains of mechanical elements employed for actuating the traverse or builder motion mechanism and the feed roll drive mechanism. The remaining three pulleys 311 merely function to support the belt 310 at the remaining corners of the frame.

Pulley 309 is properly keyed to the upper end 312 of the perpendicular shaft 313. Adjacent the pulley 309, the shaft 313 is journaled in anti-friction bearings 314 and 315. Both of these anti-friction bearing units are mounted in a bearing housing 316 which is adjustably bolted to the top of frame member 7 of the adjacent end frame 1. Horizontal adjustment of the bearing housing 316 is accomplished by means of the securing bolts 317 being passed through horizontal apertures 32 formed in the frame bar 7.

Below the anti-friction bearing unit 314, a dust-excluding and lubricant-sealing member 319 surrounds the shaft and is secured within the lower end of the bore of the housing 316. The upper anti-friction bearing unit is held in place by means of a ring 320 which is bolted to the upper end of the bearing housing 316. This ring 320 carries a dust-excluding and lubricant-confining packing member 321. For the purpose of lubricating the shaft bearings, an oil cup or alemite coupling 322 is threaded in the side of the housing 316.

Figure 37 discloses the mounting for each of the remaining three pulleys 311. Each one of these pulleys is mounted on the upper end portion 323 of a shaft 324. The lower end of this shaft does not project below the top bar 7 of the end frame member. The anti-friction bearing units with their supporting bearing housing, the manner of connecting the housing to the end frame member 1, and the packing for the upper end of the bearing housing are all the same as the elements specifically described in connection with the structure disclosed in Figure 33. These elements, therefore, will be given the same reference numerals as have been applied in Figure 33.

The lower anti-friction bearing unit 314 is in this assembly retained in place by means of a cap or plug 325 which is suitably bolted to the lower end of the bearing housing 316. This cap or plug functions to exclude dirt and dust from the lower bearing member and to prevent leakage of lubricant which is applied to the bearing by means of the lubricant connection 322.

By inspecting Figure 1, it will be seen that the belt 310 is supported by the various pulleys 309 and 311 so that the opposite sides or long runs of the belt are properly positioned to be engaged by all of the spindle whirls. A suitable number of idler rolls 326 are mounted along the opposite sides of the machine frame, on the spindle rails, and are arranged to engage the belt 310 on the side of the same opposed to the spindle whirls. These idler rolls 326 will very effectively maintain the long runs of the belt in operative relation to the various spindles.

Figure 1 very clearly illustrates the fact that the belt 310 is of an endless character and may be readily positioned upon all of the pulleys 299, 309, and 311 by merely being slipped down over the peripheries of the pulleys. This application of the belt to the several pulleys, of course, should be accomplished without the tensioning mechanism being applied to the electric motor pulley 299. No difficulty is encountered in placing the endless belt 310 within the confines of the machine frame for this can be accomplished by threading the endless belt into the frame through the space provided between the bracket arms 8 and 10 at one end of the frame. The arched portion 22 of the intermediate frame member 21 allows for proper manipulation of the belt to enable it to be inserted in the frame and applied to the various pulleys while in an endless condition. This adaptability of the frame structure to receive an endless spindle driving belt is believed to be unique with this machine.

The drive for the traverse or builder motion and the feed rolls is taken from the lower end of shaft 313. This is considered to be an extremely important feature of construction. The drive for the various spindles and the traverse or builder motion and feed rolls will be uniformly affected by any slippage of the belt 310 on the pulley 299 which is driven by the electric motor 289. Spinning frames now in common use on the market employ a belt drive for the various spindles and a separate drive from the electric motor to the traverse or builder motion and the feed rolls. Any slippage which occurs in the spindle belt drive does not affect the drive for the traverse or builder motion and the feed rolls. The spindles, therefore, can very readily operate in improper timed relation with respect to the feed rolls and the reciprocation of the ring spinners.

The lower end of the pulley shaft 313 has a socket 327 formed therein for the reception of the upper end of the stub shaft 328. Proper openings are provided in these telescoped ends of the shafts to receive a transverse key 329 which will drivingly connect the shafts.

The lower end of the stub shaft 328 is journaled in an anti-friction bearing unit 330. This bearing unit is mounted in a gear frame 331a which is bolted to the lower portion of the end frame member 1. A detachable cap or plug 331 is provided for sealing the bearing unit 330 against the admission of foreign matter and for retaining lubricant. A lock nut 332 is threaded to the lower end of the stub shaft 328 to retain the anti-friction bearing member 330 and stub shaft properly positioned with respect to each other.

A worm 333 is suitably mounted upon the stub shaft 328 and meshes with a worm wheel 334 keyed to a shaft 335 which is mounted in the fixed bearing arms 336 and 337 of the transmission frame 331a.

The stub shaft 335 is adapted to have removably keyed thereto a gear 338. This gear meshes with a second gear 339 which is removably keyed to a stub shaft 340 mounted at one end in a fixed bearing 341 carried by the gear frame 331a. A bearing plate 342 is removably clamped to the arms 343 and 344 of the gear frame 331a by means of the bolt 345. This removable bearing plate 342 has formed thereon a bearing 346 which supports the outer end of the shaft 335. A second bearing 347 is formed on the plate 342 for assisting in supporting the shaft 340.

A sprocket wheel 348 is suitably keyed to the shaft 340 and has trained thereover a sprocket chain 349. This sprocket chain is illustrated in Figure 38 as being trained over a sprocket wheel 155 which is shown in Figure 15 as being mounted upon the drive shaft 154 of the traverse or builder motion mechanism. Figure 38 also discloses the sprocket chain 349 as being trained over a sprocket wheel 351. Figure 2 discloses the sprocket wheel 351 as being mounted upon the longitudinally extending shaft 48 which carries beveled pinions 353 which mesh with the beveled pinions 354 for the various shafts 263 which drive the different feed rolls. It will be understood that one pinion 353 is provided on the shaft 48 for each one of the feed roll drive shafts. If desired, the shaft 48 may be made in one section to extend the entire length of the machine frame. It has been determined, however, that forming this shaft into several sections which are properly coupled together materially expedites assembly of the pinions 353 on the shaft. It also enables damaged pinions to be more readily replaced by new pinions.

Figure 36 discloses a sprocket chain idler 355 which is mounted on a shaft 356 carried by an adjustable arm 357 which is fastened to the frame by the bolt 358. It will be appreciated that different sized sprocket wheels may be substituted for those designated by the reference characters 155, 348, and 351 if different relative speeds of operation are desired for the traverse or builder motion and the feed rolls. The chain idler 355 is mounted on the adjustable arm 357 for the purpose of compensating for changes in speed ratio between these various sprocket wheels.

Figure 38 discloses the gear wheels 338 and 339 as being of the same diameter and as having fifty-four teeth on each gear. It has been determined that the speed of rotation of the various spindles as compared to the rate of feed of yarn by the feed rolls determines the number of turns per inch placed in the yarn. Figure 38 discloses a gear ratio which will produce a comparatively low left twist to the yarn. A right twist may be obtained with this same gear ratio by removing the sprocket 348 from the shaft 340 and mounting the same on the extension of the shaft 335, as shown in dotted lines in Figure 35. Figure 39 discloses a different gear ratio which will provide a much higher left twist than that produced by the gear ratio disclosed in Figure 38. The gear ratio in Figure 39 is made possible by substituting a gear 355 for the gear 338 and a gear 356 for the gear 339. These gears 355 and 356 are intended to be mounted upon the shafts 335 and 340, respectively, after the gears 338 and 339 have been removed from said shafts. The gear 355 is provided with seventy-two teeth while the gear 356 has thirty-six teeth. This change in the number of turns per linear inch is accomplished while maintaining a left twist. If a right twist is desired, it can be accomplished by reversing the leads for the electric motor 289. This reversal of leads will cause the motor armature to rotate in the opposite direction and will reverse the direction of travel of the belt 310.

As the traverse or builder motion and the feed rolls must be driven in the same direction while producing both right and left twist, an idler pinion 357 is disclosed as being interposed between the gear 338 and the gear 356. To maintain the ratio of drive the same between the gears 338 and 356 as that disclosed in Figure 39, the idler gear 357 should have the same number of teeth as the gear 356, namely, thirty-six teeth. Figure 33 discloses a bearing 358 which is employed, when using the gear arrangement of Figure 40, to receive the shaft 340 with the gear 356 and sprocket wheel 348 mounted thereon. The idler gear 357 is arranged with its shaft 359 mounted in the bearing 341, previously occupied by the shaft 340. The sprocket chain idler 355 may be adjusted to take care of the change of position of the sprocket wheel 348 and its shaft 340 to the new position represented by the bearing 358.

*Method performed by previously described apparatus*

It is believed that the coordination and operation of the various mechanical units entering into the complete machine have been made clear in the foregoing description. It remains, however, to give some consideration to the method of fully throwing lustrous yarn that can be accomplished through the medium of the described mechanism.

Important factors entering into the specifications for thrown yarn are evenness, cleanness, neatness, and elasticity. The process of throwing materially affects all of these factors. The factors of evenness, cleanness, and neatness are expressed in present-day classification in terms of per cent. The highest grade thrown yarns are classified in the "'AAA" grade. To be allocated to this grade, the yarn must have an evenness of approximately 90%, cleanness of approximately 92%, and neatness of approximately 90%. It is difficult in presently employed throwing processes to produce fully thrown yarn conforming to these specifications.

The repeated operations upon the yarn incident to winding, doubling, twisting, redrawing, and coning as currently practiced greatly abuse and injure the silk, resulting in the presence in the final yarn of such defects as split filaments, loops, and knots. Prior to throwing, the raw yarn to be processed is first soaked in an oil emulsion for imparting thereto the necessary lubricant to facilitate throwing. In currently operated processes the yarn is subjected, during the process of throwing, to from two to four cleaning steps and to at least two operations in which it is subjected to high centrifugal force. These operations tend to denude the yarn of the lubricant and cause the same to be injured, resulting in broken filaments and the like. The repeated subjection of the yarn to varying degrees of tension in repeated operations results in elongation and deformation of the yarn, increasing the degree of unevenness and also the natural elasticity of the yarn, as well as deforming the contour of the thrown yarn.

The present method for throwing yarn which is practiced through the employment of the herein described apparatus tends to obviate and, to a very large extent, eliminate the foregoing disadvantages present in currently employed throwing processes. In addition, in accordance with the present method, applicant produces a finished yarn package in which the yarn is wholly free from objectionable knots and on which the yarn is wound in such manner as to preserve its contour and natural elasticity while at the same time permitting the yarn to be removed from the package either in a knitting or weaving operation without likelihood of breaking the yarn.

Coming now to a consideration of those steps in the applicant's method which contribute to the meritorious results obtained thereby, it is to be observed that the applicant supports the individual starting ends on stationary supports, and there is thus no drawing of the individual ends incident to the turning of bobbins or the like. It is quite apparent that in operations where single ends are drawn from bobbins rotated by tension imposed upon the single ends, there is a distinct pull placed upon the respective single ends. Additionally this pull will vary for the respective ends because of differences in the amount of yarn on the respective bobbins and because of possible differences in the frictional resistance to the rotation of the respective bobbins as well as to other factors.

In accordance with the applicant's method, each single end is removed from a stationary supply with just sufficient tension to control the stop motion circuit. Additionally, in accordance with applicant's method, each single end is subjected to identical tension conditions so that the single ends that enter the composite yarn are all under precisely the same condition. Next the applicant, in feeding the condensed or composite yarn to the ring spinner, provides a feeding instrumentality, namely the large feed roll, through the medium of which a sufficient circumferential area is provided to impose upon the yarn the requisite traction for feeding without unduly straining the yarn. It will thus be seen that in applicant's method the composite yarn is fed to the single spinning step without being subjected to any degree of tension that will appreciably elongate the yarn or minimize its original elasticity.

Furthermore, in accordance with applicant's method, the entire twist requisite to fully throw the yarn is imparted thereto through the employment of but a single spinning step, and it is possible, through the medium of this single spinning step, to impart extremely high twist to the yarn, running as high as eighty turns per inch if desired. This operation is made possible for the reason that in applicant's method there is maintained in a condition suitable for absorbing twist an adequate supply of composite doubled yarn in advance of the spinning step. Translating this to applicant's apparatus, it will be observed that the doubled composite strand extends down from the condensing eye at the top of the tension bar to and a plurality of times around the large feed roll. The feed roll retains the composite yarn in a condition that permits absorbing of the twist thereby without imposing upon the yarn, as a result of the absorbed twist, any deleterious tensioning effect so that the yarn is spun under conditions that permit the same to partake of the twist without thereby affecting the natural elasticity or contour of the individual ends entering into the finished yarn. Due to this condition, it has been ascertained that yarn produced in accordance with applicant's method is not only possessed of a high degree of evenness, running around 95%, but is furthermore possessed of a substantially uniform round contour as distinguished from the irregular contour and periodic flatness of currently thrown yarn.

Additionally, due to the cooperative relationship of the applicant's method of supplying the yarn to the single step and his method for laying the spun yarn on the finished package, the fully thrown yarn retains in the packaged form its high degree of elasticity and uniform round contour. This is due to the fact that the applicant so correlates his builder motion to his finished package that the yarn is laid on the package without being subjected to any injurious tensioning action. The contour and mode of construction of the package furthermore permit of the taking off of the thrown yarn therefrom without in any way affecting the desirable characteristics possessed thereby.

Because of the relationship of the single end supply through the feeding mechanism in applicant's method, it is possible to eliminate the presence in the final yarn of any objectionable knots. There is in applicant's scheme an adequate supply of single end strands in advance of the feeding mechanism to permit the tying of any single end that may break in the throwing operation, and, as is appreciated, such single end knot is unobjectionable in the finished yarn. It will be observed, however, that single end breaks are very materially reduced in applicant's method because of the minimum tension necessarily imposed on any single end. Even in the event that a break occurs in the composite strand intermediate the feed roll and the package, it is possible to splice the same in such manner as to provide staggered single end knots and avoid any objectionable knot in the finished yarn. This is accomplished by merely clamping the twisted end withdrawn from the package, opening the same and tying the single ends, and then again resuming the spinning operation to re-impart the requisite twist to the yarn at the point of the splice.

It will, of course, be appreciated that the splicing of the composite yarn is made possible in accordance with the present invention because, first, the entire twist is inserted in the yarn in a single spinning step and, second, the yarn is packaged in final form directly from the ring spinner. This permits reinsertion of the twist which is necessarily opened up for the purpose of making the single end splice.

Because of the fact that in applicant's method the yarn is fully thrown in a single spinning step, it retains the lubricant to a far greater degree than is possible in conventionally employed throwing practices. Because of this factor and further because the yarn is not repeatedly subjected to the friction of multiple cleaning operations, applicant's yarn is substantially free of split filaments, and the like.

In a test of five hundred dozen hose made from yarn produced by applicant's method, there were found but 10% of "irregulars" whereas with yarn produced by the currently employed throwing processes utilizing the steps of winding, doubling on a 5-B machine, twisting on an up-twister, and coning, the "irregulars" ran from 20 to 23%. These were comparative tests made in the same knitting mill on the same knitting machines using the single carrier system.

While the invention has been described with specific reference to a down ring spinner, it will, of course, be appreciated that the benefits of the invention can be obtained through the employment of a cap spinner or a like spinning element.

I claim:

1. A method for throwing lustrous yarn without substantially diminishing its initial elasticity comprising doubling single ends, feeding the doubled yarn to a ring spinner, imparting to the doubled yarn in a single spinning step through the medium of a down ring spinning operation the entire twist required for fully thrown yarn, and maintaining sufficient available doubled yarn in advance of the traveler of the ring spinner and including the feeding step to absorb the twist without tensioning the yarn to a degree that will cause substantial deformation or elongation thereof.

2. A method for producing fully thrown lustrous yarn possessing a high degree of evenness, cleanness, and elasticity and having a substantially constant uniform round configuration, comprising taking off individual ends from stationary supplies at a constant speed under uniform tension, doubling the individual ends and feeding the composite yarn with minimum drag to the traveler of a ring spinner, maintaining sufficient available yarn in advance of the traveler to absorb the twist without distorting the yarn or minimizing its natural elasticity, and finally collecting the fully shown yarn on a final package directly from said traveler.

3. A method for throwing lustrous yarn to produce tram or crepe yarn comprising taking off individual ends from stationary supplies under uniform tension and at constant speed, doubling the individual ends and supplying the composite strand to a large diameter feed roll at a point remote from that at which the doubling is effected, supplying the composite strand from the feed roll to the traveler of a ring spinner and thence directly to the final package, and providing sufficient available yarn for absorbing twist in advance of the traveler to permit fully throwing the yarn in a single spinning step without substantially minimizing the natural elasticity of the starting material.

4. A method for down spinning lustrous yarn comprising maintaining a plurality of single end supplies on stationary bobbins, drawing each single end over a head of its associated bobbin with just sufficient pull to lift and take off the yarn from the stationary bobbin, separately imposing a uniform tension of a magnitude not substantially exceeding said pull on each single end, doubling the single ends at a point sufficiently remote from the individual bobbins to maintain a long stretch of yarn intermediate the single end supplies and the point of doubling, supplying the composite doubled yarn to a large diameter feed roll, maintaining separate individual laps of doubled yarn on the feed roll, supplying the doubled yarn from the feed roll to a ring spinner, imparting thereto the requisite twist to fully throw the yarn, and finally winding the fully thrown yarn on a final package direct from the ring spinner.

5. A method for producing final packages of fully thrown lustrous yarn from individual end supplies employing a single spinning step, comprising taking off the several individual ends from their respective supplies at a constant uniform speed, imposing just sufficient tension on each individual end to hold an automatic stop motion control element in inoperative position, automatically varying the mechanically imposed tension to compensate for irregularities in pull required to feed the individual end, thus insuring application of uniform tension to each end supply, doubling a plurality of individual ends at a point remote from the supplies and thence leading the composite doubled strand to a large diameter feed roll, maintaining on the circumference of the feed roll a sufficient length of yarn to provide the requisite traction to feed the doubled yarn while under the influence of the rolling action imparted to the yarn on the roll by the high twist being imparted thereto, and leading the composite doubled yarn from the feed roll to the traveler of a ring spinner and thence to a package carried by a spindle.

6. A multiple down ring spinning apparatus for forming final packages of fully thrown lustrous yarn employing a single spinning step comprising a plurality of units, each embracing a plurality of single end supply supports for supporting stationary supplies, condensing means remote from said supply supports to effect doubling of the single ends, a ring spinner, a traveler on the ring adapted to receive the composite yarn from said feed roll, means in advance of the traveler and including a large diameter feed roll for maintaining a sufficient length of yarn to absorb high twist, a vertical spindle on which the final package forms, stop motion means for interrupting the supply of yarn to any package on the breaking of any single end entering the composite yarn being supplied thereto, and means for traversing the ring with respect to the spindle.

7. A multiple down ring spinning apparatus for throwing lustrous yarn comprising a plurality of units, each including means for supporting a plurality of end supplies, means for maintaining a substantially uniform tension on each end, said means automatically compensating for slight irregularities in individual end feed, means for maintaining a long stretch of each individual end in advance of the point of doubling, and means associated with said tensioning means for stopping the feed to the ring spinner in the event of the breaking of any end, a single feed roll having a large diameter, means for supplying the condensed doubled strand to the feed roll, the arrangement being such that there is also provided a long stretch of the doubled strand in advance of the feed roll, a ring spinner, a traveler on said ring spinner, and a spindle for supporting a suitable base for a finished package.

8. An apparatus for fully throwing lustrous yarn comprising a multiple down ring spinning machine provided with stationary individual end supply supports, an automatically variable mechanical tension applying device individual to each end, a single large diameter feed roll, condensing means for doubling the individual ends remote from said stationary supplies and also remote from said feed roll, and a stop motion control means associated with each of said mechanical tension applying devices effective to stop the feed roll upon the breaking of any single end before the ruptured end reaches the point of application of twist to the composite yarn.

9. The method of producing fully thrown lustrous yarn possessing a high degree of evenness, cleanliness and elasticity and having a substantially constant uniform round configuration when wound in a final package, comprising taking off single ends from stationary supplies under a uniform tension, doubling said ends and spinning the same to fully throw yarn in a single spinning step without imposing thereon a tension that will substantially minimize the natural elasticity of the material thrown, and directly collecting the fully thrown yarn coming from the spinning step in final package form by winding the yarn on a receiving tube in a multiple cycle wind with the cycles being grouped in successively duplicated series, each series of which collectively applies yarn to the full length of the package and with the successive cycles of each group being started on the package at a different point relative to the length of the package.

10. The method of producing a final package ready to enter a fabric forming machine comprising the steps of winding the yarn on a receiving tube in a multiple cycle wind, grouping the cycles in successively duplicated series, each series of which collectively applies yarn to the full length of the package, and starting the successive cycles of each group on the package at a different point relative to the length of the package.

11. A method of silk throwing and forming a quill or cop of a twisted multi-strand thread, which comprises delivering the condensed strand to a ring spinner and winding the same in the form of a quill or cop by winding the thread in a cycle with a traverse always shorter than the desired length of the quill or cop, effecting a relatively small gain until a desired portion of the final length of the quill or cop has been traversed and then returning the thread to a point slightly spaced lengthwise of the quill or cop from the starting point whereby a complete cycle is formed; repeating the cycle until a series composed of a predetermined number of cycles has been formed and the full length of the quill or cop has been traversed, returning the thread to the starting point of the first cycle of the series, and repeating the series of cycles until the quill or cop is fully formed.

12. A cop or quill forming apparatus comprising, in combination with a down spinning machine, a ring, means for effecting a traverse of the ring of uniform amplitude, means for effecting a gradual gain of the traverse longitudinally of the quill in one direction and for effecting a quick return of the traverse, and means for modifying the action of the last mentioned means to effect stoppage of the traverse return at a point spaced longitudinally of the quill from its previous starting position so that the next starting position will be at the point of stoppage of the traverse return.

13. A cop or quill forming apparatus comprising, in combination with a down spinning machine, a ring, a heart cam for effecting a traverse of the ring of uniform amplitude, a substantially half heart cam for effecting a gradual gain of the traverse longitudinally of the quill in one direction and for effecting a quick return of the traverse, and a multi-sided cam for modifying the action of the last mentioned means to effect stoppage of the traverse return at a point spaced longitudinally of the quill from its previous starting position so that the next starting position will be at the point of stoppage of the traverse return.

14. A multiple down ring spinning apparatus for throwing lustrous yarn comprising a plurality of units, including means for supporting a plurality of end supplies, means for maintaining a substantially uniform tension on each end, said means automatically compensating for slight irregularities in individual end feed, means for maintaining a substantial length of each individual end in advance of the point of doubling, and means associated with said tensioning means for stopping the feed of the ring spinner in the event of breaking of any end, a single feed roll having a large diameter, means for supplying the condensed doubled strand to the feed roll, the arrangement being such that there is also provided a substantial length of the doubled strand in advance of the feed roll, a ring spinner, a traveler on said ring spinner, a spindle for supporting a suitable base for a finished package, and a traverse motion common to said plurality of units for building in a series of cycles a barrel-shaped package on said base, said traverse motion comprising means for effecting a traverse of the ring of uniform amplitude, means for effecting a gradual gain of the traverse longitudinally of the package in one direction and for effecting a quick return of the traverse, and means for modifying the action of the last mentioned means to effect stoppage of the traverse return at a point spaced longitudinally of the package from its previous starting position so that the next starting position will be at the point of stoppage of the traverse return.

15. A multiple down ring spinning apparatus for throwing lustrous yarn comprising a plurality of units, each including means for supporting a plurality of end supplies, means for maintaining a substantially uniform tension on each end, said means automatically compensating for slight irregularities in individual end feed, means for maintaining a substantial length of each individual end in advance of the point of doubling, and means associated with said tensioning means for stopping the feed to the ring spinner in the event of breaking of any end, a single feed roll having a large diameter, means for supplying the condensed doubled strand to the feed roll, the arrangement being such that there is also provided a substantial length of the doubled strand in advance of the feed roll, a ring spinner, a traveler on said ring spinner, a spindle for supporting a suitable base for a finished package, and a traverse motion common to said plurality of units for building in a series of cycles a barrel-shaped package on said base, said traverse motion comprising a heart cam for effecting a traverse of the ring spinner of uniform amplitude, a substantially half-heart cam for effecting a gradual gain of the traverse longitudinally of the package in one direction and for effecting a quick return of the traverse, a multi-sided cam for modifying the action of the last mentioned cam to effect stoppage of the traverse return at a point spaced longitudinally of the package from its previous starting position so that the next starting position will be at the point of stoppage of the traverse return.

16. A method for down spinning lustrous yarn comprising maintaining a plurality of single end supplies on stationary bobbins, drawing each single end over a head of its associated bobbin with just sufficient pull to lift and take off the yarn from the stationary bobbin, separately imposing a uniform tension of a magnitude not substantially exceeding said pull on each single end, doubling the single ends at a point sufficiently remote from the individual bobbins to maintain a substantial length of yarn intermediate the single end supplies and the point of doubling, supplying the composite doubled yarn to a large diameter feed roll, maintaining separate individual laps of doubled yarn on the feed roll, supplying the doubled yarn from the feed roll to a ring spinner, imparting thereto the requisite twist to fully throw the yarn, maintaining sufficient available doubled yarn in advance of the ring spinner to absorb the entire twist without tensioning the yarn to a degree that will cause substantial deformation or elongation thereof, and finally winding the fully thrown yarn on a final package direct from the ring spinner.

17. A method of producing final packages of fully thrown lustrous yarn from individual end supplies employing a single spinning step, comprising taking off the several individual ends from their respective supplies at a constant uniform speed, imposing just sufficient tension on each individual end to hold an automatic stop motion control element in inoperative position, automatically varying the mechanically imposed tension to compensate for irregularities in pull required to feed the individual end, thus insuring application of uniform tension to each end supply, doubling a plurality of individual ends and thence leading the composite doubled strand to a large diametered feed roll, maintaining on the circumference of the feed roll a sufficient length of yarn to provide the requisite traction to feed the doubled yarn while under the influence of the rolling action imparted to the yarn on the roll by the high twist being imposed thereon, and leading the composite doubled yarn from the feed roll to the traveler of a ring spinner and thence to a package carried by a spindle.

18. A multiple down ring spinning apparatus for throwing lustrous yarn comprising a plurality of units, each including means for supporting a plurality of end supplies, means for maintaining a substantially uniform tension on each end, said means automatically compensating for slight irregularities in individual end feed, means for maintaining a long stretch of each individual end in advance of the point of doubling, and means associated with said tensioning means for stopping the feed to the ring spinner in event of the breaking of any end, a single feed roll having a large diameter, means for supplying the condensed doubled strand to the feed roll, a ring spinner, a traveler on said ring spinner, and a spindle for supporting a suitable base for a finished package.

JOSEPH P. McHUGH.